(12) United States Patent
Rajguru

(10) Patent No.: US 8,615,216 B2
(45) Date of Patent: Dec. 24, 2013

(54) SYSTEMS AND METHODS FOR MANAGING MOBILE COMMUNICATIONS

(75) Inventor: Rahuldev Rajguru, Rajkot (IN)

(73) Assignee: LocusPlay, Inc., Providence, RI (US)

( * ) Notice: Subject to any disclaimer, the term of this patent is extended or adjusted under 35 U.S.C. 154(b) by 367 days.

(21) Appl. No.: 12/691,419

(22) Filed: Jan. 21, 2010

(65) Prior Publication Data
US 2010/0190474 A1    Jul. 29, 2010

Related U.S. Application Data

(60) Provisional application No. 61/146,759, filed on Jan. 23, 2009.

(51) Int. Cl.
H04M 1/66 (2006.01)

(52) U.S. Cl.
USPC .......................... 455/410; 455/567

(58) Field of Classification Search
USPC ....................... 455/410–411, 567
See application file for complete search history.

(56) References Cited

U.S. PATENT DOCUMENTS

| | | | |
|---|---|---|---|
| 6,941,134 B2 | 9/2005 | White | |
| 7,042,997 B2 | 5/2006 | Jones | |
| 7,107,349 B2* | 9/2006 | Britt, Jr. | 709/229 |
| 7,477,907 B2 | 1/2009 | Koch et al. | |
| 7,505,762 B2 | 3/2009 | Onyon et al. | |
| 7,515,569 B2* | 4/2009 | Prasad | 370/338 |
| 7,539,747 B2 | 5/2009 | Lucovsky et al. | |
| 8,131,281 B1* | 3/2012 | Hildner et al. | 455/418 |
| 2002/0077158 A1* | 6/2002 | Scott | 455/567 |
| 2003/0117316 A1* | 6/2003 | Tischer | 342/357.1 |
| 2004/0063424 A1* | 4/2004 | Silberstein et al. | 455/410 |
| 2004/0267887 A1* | 12/2004 | Berger et al. | 709/206 |
| 2005/0136949 A1* | 6/2005 | Barnes, Jr. | 455/461 |
| 2006/0099937 A1* | 5/2006 | Helvick | 455/418 |
| 2006/0129972 A1 | 6/2006 | Tyburski et al. | |
| 2006/0166678 A1* | 7/2006 | Karaoguz et al. | 455/456.1 |
| 2006/0256734 A1* | 11/2006 | Erhart et al. | 370/254 |
| 2007/0038680 A1 | 2/2007 | Casey | |
| 2007/0173238 A1* | 7/2007 | Ali-Vehmas | 455/416 |
| 2007/0250645 A1 | 10/2007 | Meadows et al. | |
| 2008/0130860 A1 | 6/2008 | Mullis et al. | |

FOREIGN PATENT DOCUMENTS

WO    WO 2007/098508 A1    8/2007

OTHER PUBLICATIONS

International Search Report and Written Opinion dated Aug. 23, 2010, International Application No. PCT/US2010/021632.

* cited by examiner

*Primary Examiner* — Steven Lim
(74) *Attorney, Agent, or Firm* — Finnegan, Henderson, Farabow, Garrett & Dunner, LLP

(57) ABSTRACT

Systems and methods for managing mobile device users' data, mobile devices, and communications are disclosed. According to various embodiments, mobile devices are used in conjunction with one or more servers and memory devices in order to manage mobile devices, data, and communications associated with mobile device users. Various embodiments of the disclosed systems and methods are directed to: the management of preference information incorporated into profiles associated with mobile device users, plug-in applications communicatively coupling servers involved in the management of mobile data, devices and/or communications to applications providing calendar and e-mail management facilities, the cross-platform synchronization and migration of data associated with mobile device users, the management of unwanted communications, monitoring mobile devices and data for theft detection and related protections, and the management of scheduled communications.

14 Claims, 22 Drawing Sheets

Add/Update User Information

| | | | |
|---|---|---|---|
| Company Name: | Aquilonis | Address1: | |
| Account Number: | ABC00C234 | Address2: | |
| Password: | ******** | City: | San Rafael |
| First Name: | Peter | State: | California |
| Middle Name: | | Country: | USA |
| Last Name: | Gibs | Pin/Zip Code: | 94901 |
| E-Mail Address: | Peter.Gibs@aquilonis.com | | ☐ Active |
| Alternate Number: | 212-123-4312 | | |

Save    Close

FIG. 1A

PMS – Profile Det☑ ⇄ ▽x ◀≀ ok

| ID | Profile Name |
|---|---|
| 1 | Custom 1 |
| 2 | Meeting |

Back    Menu

FIG. 1B frmProfileDetails ☑ ⇄ ▽x ◀≀ ok

Profile Name

Custom 1

Ringing Type

Increasing ring ▼

Ringing Volume

———◻————————
　　　　5%

☑ Vibrating Alert
☐ Keypad Tone
☑ Warning Tone

Back    Menu

FIG. 1C

SYSTEMS AND METHODS FOR MANAGING MOBILE COMMUNICATIONS

RELATED APPLICATIONS

This application claims the benefit of Provisional Application No. 61/146,759 filed on Jan. 23, 2009, which is herein incorporated by reference in its entirety.

TECHNICAL FIELD

The present invention is directed generally to systems and methods for managing mobile communications. More particularly, the present invention is directed to the management of the diverse data associated with the usage of mobile communications systems, the management of mobile communication devices, as well as the real-time management of communications directed at or initiated from mobile communication devices.

BACKGROUND

Recent developments in wireless communications technologies, and particularly broadband wireless communications, have made the wireless exchange of content-rich data, such as video data, a reality. Wireless broadband communications technologies, when used in combination with mobile communication devices such as cellular phones or personal digital assistants (PDAs), provide individuals today with the ability to almost instantaneously create, update, and share information. As a result, both the diversity and sheer volume of data produced and associated with individual mobile communication device users has grown tremendously, creating the need for better mobile data management systems.

Additionally, improvements in the quality of wireless data and voice communications, as well as improvements in the coverage offered by wireless communication networks has resulted in making mobile communication devices extremely important communication tools. In fact, people often have multiple communication devices and means of being contacted. Therefore, users frequently route calls between various communication devices, for example, by initially receiving a call with one device and having it diverted to another device.

This increase in mobile device usage has, however, resulted in requiring the users of such devices to expend significant amounts of time managing incoming communications. For example, mobile device users receiving several calls per hour on their mobile devices are likely to have to devote a significant amount of attention to their devices so that they are able to receive important calls, while avoiding unimportant or vexatious calls. As mobile device users are also likely to be engaged in other tasks, such as driving or attending a meeting when calls are received, manual call screening or management may be even more burdensome for this group. Moreover, as mobile device users create, receive and share data frequently, they are often additionally burdened with tasks associated with organizing and appropriately utilizing such data.

In order to relieve some of this burden on mobile device users, systems for managing mobile communications have been developed. Many such systems address synchronization problems associated with managing the data (e.g., lists of user contacts) created and used by mobile device users, while others attempt to solve specific issues associated with managing communications (e.g., incoming calls) directed to mobile devices. What is needed is a more effective way to manage the data as well as devices associated with mobile communications, in order to more effectively manage mobile communications.

SUMMARY

Systems and methods described herein leverage data created and/or used by mobile communication device users (e.g. mobile device users' contact lists, calendars, and preference data such as the use of particular ring tones) in the management of mobile communications and mobile communication devices (mobile devices).

Some embodiments use a memory device, such as a database, to associate mobile device users, such as cellular phone users, with profile data. The profile data may include data indicative of a mobile device user's preferences, such as preferences related to the handling of incoming and outgoing communications, and preferences related to the handling of missed communications. Such embodiments may obtain a communication, such as an incoming phone call directed to a mobile device, identify, in the memory device, a mobile device user associated with the mobile device, identify one or more applicable profiles associated with the mobile device user, and apply the identified applicable profile(s) to the obtained communication. The application of a profile may result, for example, in forwarding the call to voicemail because the mobile device user is in a meeting, and the applicable profile directs all incoming calls to voicemail for the duration of the meeting.

Some other embodiments further involve associating, in a memory device, such as a database, mobile device users with their identification data (e.g. name, account number, and device identification number) and their mobile data (e.g. their contacts, call logs, and profile data). In such embodiments, a user's profile data may include data relevant to maintaining the privacy of the user's mobile data. For example, a privacy profile associated with a user's contact list may indicate whether or not one or more contacts may be shared with other users. Such embodiments may further involve obtaining, from a first electronic communication device (e.g. a computer, a personal digital assistant, or a cellular phone), identification data related to a second electronic communication device, as well as user identification data. In some embodiments, a mobile device user associated with the obtained user identification data may be retrieved from the memory device, and mobile data associated with the mobile device user may be further retrieved. According to various embodiments, the mobile data may include one or more applicable privacy profiles authorizing the transfer of some or all of the retrieved mobile data. Based on the one or more applicable privacy profiles, some or all of the retrieved mobile data may be transferred to the second electronic device.

Yet other embodiments involve an application with e-mail and/or calendar capabilities communicatively coupled, via a plug-in application, to one or more servers involved in the management of mobile data, devices, and/or communications. The plug-in application may be a custom-built software application that interfaces with the e-mail and/or calendar application, and provides the e-mail and/or calendar application with the additional functionality of being able to access and manipulate mobile device users' mobile data (e.g. profile data, contacts, call logs, and calendar data). In such embodiments, for example, mobile device users may utilize the e-mail and/or calendar application in conjunction with the plug-in application to add, delete and/or update their calendar entries. Data on a memory device, such as a database that is communicatively coupled to the one or more servers, may be further updated based on the changes made to mobile device users' calendar entries using the e-mail and/or calendar application. Further, memory devices on users' mobile devices may be additionally updated based on such changes.

In some embodiments, a user's mobile data may also include the user's preferences regarding theft protection measures that may be taken if the user's mobile device is misplaced or presumed stolen. Such embodiments may involve monitoring the user's mobile device, by, for example, monitoring usage patterns (e.g. numbers dialed, the duration of communications, and text, multimedia and e-mail messages sent and received), monitoring changes in the user's mobile data (e.g. changes associated with the user's calendar and contact lists), and monitoring ambient data obtained from the user's mobile device (e.g. data on the mobile device's location, and image, audio and video data). Various embodiments may additionally involve initiating, upon a determination that the monitored mobile device is likely to have been stolen, one or more tasks based on the mobile device user's preferences related to theft protection. In many embodiments, such tasks may comprise tasks that preserve the integrity of the mobile device user's data, tasks that prevent the misuse of the missing and/or stolen mobile device, and tasks that aid in the recovery of the missing and/or stolen mobile device.

In various other embodiments, a first memory device, such as a database associated with one or more servers involved in the management of mobile communication, may associate mobile device users' mobile data (e.g. call logs, contacts, calendar data, and profile data) with timing data such as timestamps that indicate when such data was created and/or last updated. In such embodiments, the one or more servers may periodically identify, in the memory device, mobile data associated with a particular mobile device user, as well as timing data associated with the mobile data. The one or more servers may thereafter obtain, from an electronic communication device (e.g. a PDA, cellular phone or computing device), a second set of mobile data and timing data that is associated with the same mobile device user, but stored on a second memory device (e.g. one associated with a client device, such as the particular user's mobile device). In such embodiments, the one or more servers may perform one or more comparisons using the timing data associated with the first memory device and the timing data associated with the second memory device. Such embodiments may additionally involve synchronizing the first and second memory devices based on the one or more comparisons performed.

According to some other embodiments, a communication directed to a mobile device (e.g. an incoming call), may be obtained by an application executing on the mobile device or an application executing on one or more servers involved in the management of the mobile device. In such embodiments, the user of the mobile device may then be presented with options for avoiding the communication. The options may comprise, for example, an option to duck the communication, an option to drop the communication, and an option to divert the communication. If the duck option is selected by the user, the initiator of the communication (e.g. the caller) may receive the message that the associated mobile network operator typically provides on call rejection. Alternatively, if the drop option is selected by the user, the initiator of the communication may experience a response that approximates the response a caller might receive when a network error occurs. Alternatively, if the divert option is selected by the user, the communication may be diverted to a third party (e.g. voice mail or a different number). According to some embodiments, the application executing on the mobile device or executing on the one or more servers may automatically handle unwanted calls directed to the mobile device by ducking, dropping, or diverting them after they are detected.

According to yet other embodiments, mobile device users may schedule future communications by using a calendar application (e.g. MS-Outlook or any other such application). The future communications may include various types of communications, including phone calls, SMS messages, and/or e-mail messages. Mobile device users may provide communication schedule data to schedule communications, the data comprising, for example, a start date and time, an initiating mobile device, recipient information (e.g. a recipient number, a recipient e-mail address and a recipient contact) and a communication category indicating the type of communication to be scheduled (e.g. social, business or miscellaneous). In such embodiments, after a mobile device user successfully schedules a communication, the user may be alerted prior to the start time of the scheduled communication. The alert possibly may take the form of an audible beep, a vibration, and/or a textual message, and may be created by the mobile device responsible for initiating the scheduled communication. Additionally, in various embodiments, the scheduled communication may be initiated at the scheduled date and time, using the recipient number, recipient e-mail address and/or recipient contact information provided as part of the communication schedule data. In many embodiments, one or more of the above actions may be performed by an application executing on the mobile device responsible for initiating the scheduled communication, and/or by an application executing on one or more servers involved in the management of mobile devices, data, and/or communications.

BRIEF DESCRIPTION OF THE DRAWINGS

Reference will now be made to exemplary embodiments, examples of which are illustrated in the accompanying drawings. Wherever possible, the same reference numbers will be used throughout the drawings to refer to the same or like parts. The drawings are not necessarily to scale.

FIG. 1A illustrates some examples of user identification data consistent with the present invention FIGS. 1B and 1C illustrate examples of a user communication profile.

DETAILED DESCRIPTION

Managing Mobile Communications

Figure 1:
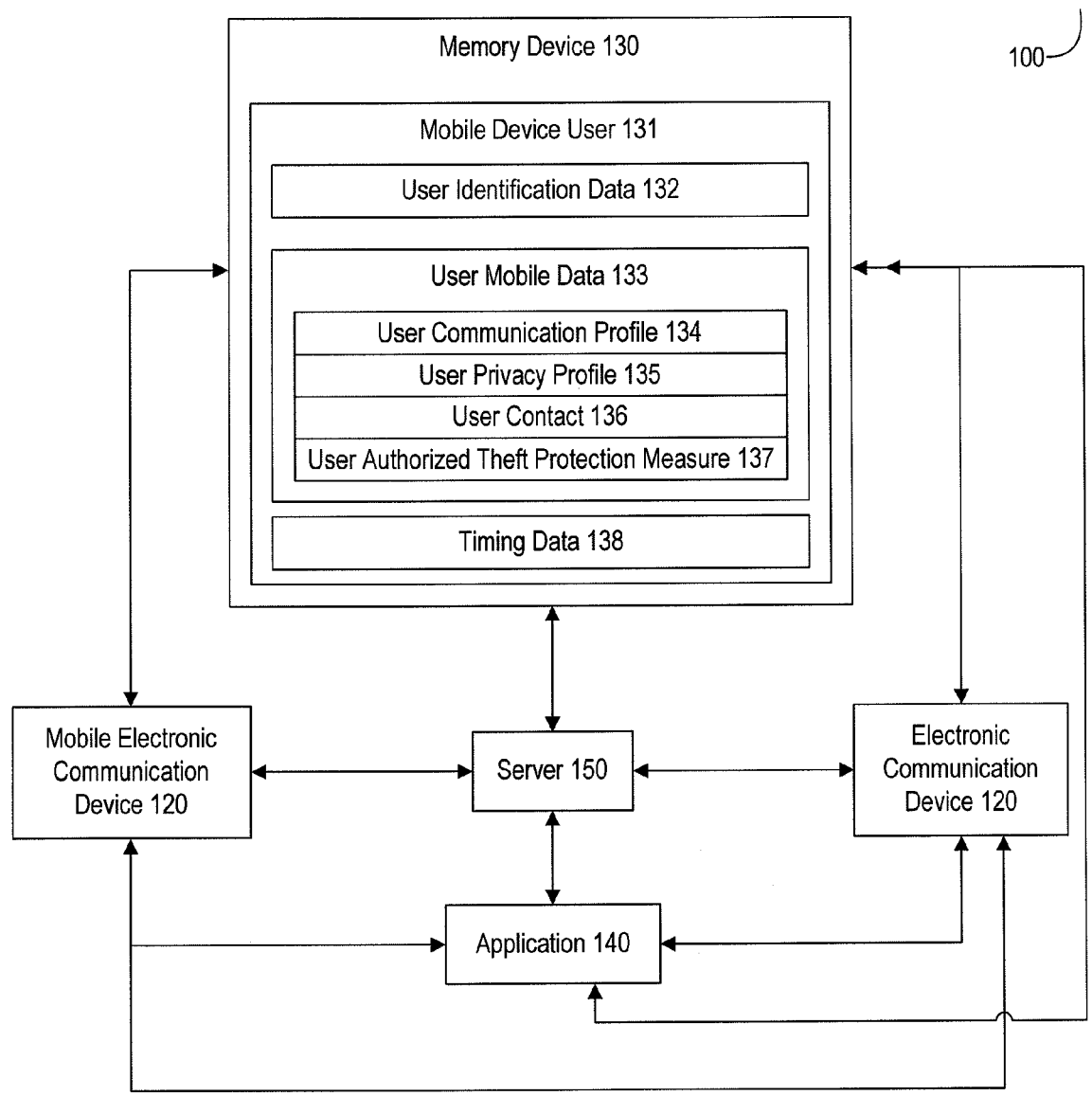
FIG. 1 illustrates a mobile data, device and communications management system according to some embodiments.

FIG. 1 illustrates a system 100 for managing mobile data, devices, and communications according to some embodiments. System 100 includes electronic communication device 110, mobile electronic communication device (mobile device) 120, memory device 130, application 140, and server 150. As the arrows in FIG. 1 indicate, the various components of system 100 may interact with each other, by, for example, providing or receiving information.

Electronic communication device 110 is a device that uses electronics or electromechanical energy to communicate information. Electronic communication device 110 may communicate information using either digital or analog signaling technology, and may comprise one or more processors and/or memory devices. Additionally, the information communicated by electronic communication device 110 may be derived from various types of data, including voice and text data. Exemplary embodiments of electronic communication device 110 include desktop or laptop computers, mobile phones, SMS devices, personal digital assistants, BLACK-BERRY® devices, PHONE® devices, Windows® Mobile devices, Symbian® devices, Android® devices, BREW® compatible devices, J2ME® compatible devices, Palm® OS devices, and Linux® devices.

Mobile device 120 is a small, portable device that uses electronics or electromechanical energy to communicate information. Mobile device 120 may communicate information using either digital or analog signaling technology, and may comprise one or more processors and/or memory devices. Additionally, the information communicated by mobile device 120 may be derived from various types of data, including voice and text data. Exemplary embodiments of mobile device 120 include mobile phones, SMS devices, personal digital assistants, BLACKBERRY® devices, IPHONE® devices, Windows® Mobile devices, Symbian® devices, Android® devices, BREW® compatible devices, J2ME® compatible devices, Palm® OS devices, and Linux® devices.

Memory device 130 is a device, tool, and/or physical media that stores information in a computer accessible form. Memory device 130 may be encoded with one or more programs capable of being executed on a processor, and may additionally be transportable, such that the one or more stored programs may be loaded onto a processor. The term "program" is used herein in its most generic sense and comprises any type of code, for example software and microcode, that may be employed to program a processor. Embodiments of memory device 130 include various types of data management and retrieval tools such as databases and data structures, as well as storage media, including volatile and non-volatile computer memory such as SD Card, MMC Card, Mini SD, Micro SD, Internal Storage, RAM, PROM, EPROM and EEPROM, compact disks, optical disks, and magnetic tape.

Memory device 130 stores information relating to one or more mobile device users. Mobile device user 131 is a computer representation of an entity, such as a person, agent, or corporation that utilizes a mobile device, such as mobile device 120, to communicate information. According to some embodiments, mobile device user 131 may register with system 100 and system 100 may thereafter manage mobile device user 131's mobile communications, data related to such communications, and/or mobile devices. According to such embodiments, mobile device user 131 may register with system 100 by using a web-based application or by contacting a system representative and providing information such as a username, a password, an IMEI number or device identification number, a phone number, and the platform(s) supported by the user's mobile device(s).

Memory device 130 associates with mobile device user 131 various types of information, including user identification data 132, user mobile data 133, and timing data 138. User identification data 132 is data relating to the identification of a mobile device user. Such data may include information that uniquely identifies a mobile device user as well as identifying data that may be shared by multiple mobile device users. User identification data 132 may include, for example, account numbers, passwords, mobile device identification numbers such as ESN and IMEI numbers, mobile and land-based phone numbers, and platform(s) supported by the user's mobile device(s).

FIG. 1A illustrates some examples of user identification data consistent with the present invention.

User mobile data 133 is any type of data relevant to, and/or associated with, mobile device user 131. User mobile data 133 may comprise, for example, profile data such as user communication profile 134 and user privacy profile 135; user contact 136; user authorized theft protection measure 137; calendar or schedule data (not shown); call-log data indicative of past communications (not shown); and audio, video, textual, and image data associated with mobile device user 131 (not shown). The terms "user mobile data" and "mobile data" are ascribed the same meaning herein. The two terms are therefore used interchangeably throughout the specification.

User communication profile 134 comprises any type of data that is relevant to a mobile device user's handling of communications such as phone calls, SMS/MMS messages, and e-mail messages, directed at or initiated by a mobile device associated with the mobile device user. According to various embodiments, user communication profile 134 may be OEM-defined or user-defined and may include, for example, a profile name, ringing types, ringing volumes, vibration alerts, keypad tones, warning tones, alerts, voice mail messages, network messages (e.g. Bluetooth® messages) and settings, and system settings. The terms "user communication profile" and "communication profile" are ascribed the same meaning herein. The two terms are therefore used interchangeably throughout the specification.

Additionally, user communication profile 134 may comprise, for example, data indicative of a mobile device user's preferences related to the handling of incoming, outgoing and/or missed communications. Preferences related to the handling of incoming communications may comprise, for example, preferences indicating that: communications should be accepted only from a set of specified callers, communications should always be rejected from a set of specified callers, communications from a set of specified mobile callers should always be diverted to a third party (e.g. voice mail or a different number), calls from one or more user specified numbers and/or contacts may be disconnected after a particular number of rings, and/or auto-answered (e.g. with the auto answer preset by the user). Preferences related to the handling of outgoing communications may comprise, for example, preferences indicating that business communications be initiated between certain hours of the day, and preferences indicating that particular personalized content accompany various outgoing personal communications. And preferences related to the handling of missed communications may comprise, for example, preferences indicating that particular personalized messages should be communicated (e.g. via e-mail or SMS) in response to missed calls registered from a set of specified callers. In many embodiments, a user's preferences related to the handling of incoming, outgoing, and/or missed communications may include preferences related to the handling of calls from teller machines as well preferences related to the handling of auto answers.

FIGS. 1B and 1C illustrate examples of a user communication profile.

User privacy profile 135 is data that is relevant to the privacy of information associated with a mobile device user. User privacy profile 135 may comprise, for example, user preferences relating to preserving the privacy of the various types of user mobile data (e.g. user contacts, call logs, user communication profiles, and calendar data) that may be associated with a mobile device user. User privacy profile 135 may also comprise data indicative of user-authorized theft protection measures. User privacy profile 135 may be maintained as a separate collection of user preferences and/or may be associated with individual user mobile data items, such as individual user contacts, for example. User privacy profile 135 may additionally allow mobile device users to easily and selectively share particular mobile data items, while preserving the privacy of other user mobile data items. For example, a mobile device user may establish one or more privacy profiles to reflect her preference that her user calendar data only be shared with a subset of her user contacts. Subsequently, when it comes time to make automated or manual decisions regarding the sharing of her mobile data, such previously established user privacy profile(s) may be consulted. The terms "user privacy profile" and "privacy profile" are ascribed the same meaning herein. The two terms are therefore used interchangeably throughout the specification.

User contact 136 is a computer representation of an entity, such as a person, automated agent or corporation, that has an association with a mobile device user. The association may be based on, for example, a relationship that the entity has with the mobile device user, a communication that the entity has engaged in with the mobile device user, or simply the mobile device user's knowledge of the existence of the entity. User contact 136 may have associated attributes including, for example, a name, a phone number, an e-mail address, and a home address. User contact 136 may comprise a contact from a mobile device's memory, storage card, and a contact from a SIM card memory. The terms "user contact" and "contact data" are ascribed the same meaning herein. The two terms are therefore used interchangeably throughout the specification.

User authorized theft protection measure 137 is data that is relevant to user sanctioned actions that may be taken in the event that a mobile device is presumed to be lost or stolen. User authorized theft protection measure 137 may comprise, for example, authorization to engage in tasks that preserve the integrity of data associated with a mobile device user, prevent the misuse of a mobile device that is presumed to be lost or stolen, and/or aid in the recovery of a mobile device that is presumed to be lost or stolen.

Timing data 138 is time-related data associated with one or more user mobile data items (e.g. mobile data items that are included within user mobile data 133). Timing data 138 comprises, for example, time-stamp data indicating a time at which a related user mobile data item was created, updated and/or refreshed.

Application 140 is software, hardware and/or firmware that interfaces with, communicates with and/or is otherwise associated with one or more of mobile device 120, server 150, electronic communication device 110, and memory device 130. Embodiments of application 140 include computer code capable of being executed as part of server 150, hardware or firmware associated with server 150, computer code executed by or otherwise associated with mobile device 120, and hardware or firmware that is part of or otherwise associated with mobile device 120.

Server 150 is a device or tool that delivers services to client devices or programs. Server 150 may be implemented in hardware, software, and/or firmware. For example, server 150 may be one or more computer programs or one or more devices incorporating computer programs, where the computer programs deliver services to client devices or programs. The delivery of services may include, for example, gathering and presenting relevant information in response to requests placed by client devices or programs. Embodiments of server 150 may be located in the same devices that house client devices or execute client programs. Additionally, embodiments of server 150 may be physically and/or logically separated from client devices and/or programs. Embodiments of server 150 may also be distributed among various devices and/or programs. Various embodiments of server 150 may additionally have the capability to store and retrieve data for a variety of mobile platforms including Win CE®, Windows® Mobile, Symbian®, IPHONE®, BREW®, Java® Phone, Linux®, Palm® OS, ANDROID®, BLACKBERRY®, web OS®, Nucleus®, and Maemo®.

Embodiments of server 150 may process data related to mobile device users, the data comprising data associated with: text messages (e.g. sender's name, message contents, date and time), multimedia messages (e.g. sender's name, message contents, date and time, and attachments), e-mails (e.g. e-mail ids associated with the e-mails, subject, body content, date, time, full message headers, and attachments), contacts (e.g. contact's name, numbers, number type/category, address, photo, e-mail id, notes, title, website, birthday, and anniversary), profiles (e.g. OEM profiles, user-built custom profiles, and application suites used on a mobile device), calendar data (e.g. schedule related information, mappings of profiles to calendar schedules, and mappings of profile patterns to calendar schedules), tasks, alarms, incoming call logs (e.g. incoming call details, caller name, caller number, date and time, number type, and call duration), outgoing call logs (e.g. outgoing call details, recipient name, recipient number, date and time, number type, and call duration), missed call logs (e.g. missed call details, caller name, caller number, date and time, and number type), call management (e.g. cross platform related data, user-built custom settings, user preferences, user choices, mappings of user selected profiles to call management settings, mappings of calendaring application based calendar settings, mappings of web-based settings), device location (e.g. cell tower information, GPS coordinates, Wi-Fi hotspot related information, GPRS/EDGE/3G connectivity related information, Bluetooth related information), mobile device theft protection, OEM phone settings (e.g. regional settings, phone language, welcome note and logo, call waiting settings, call forwarding settings, PIN code, PIN2 code, PUK code, soft reset password, master (factory) reset password, voicemail settings, phone screen lock (Key Guard) settings, owner information, network settings, e-mail settings), browser/internet settings (e.g. Favorites, Bookmarks, and History), backup/restoration of $3^{rd}$ party information (e.g. settings and other information associated with a backup/restore application, $3^{rd}$ party data, databases and files), backup/restoration of personal data (e.g. photo gallery and multimedia gallery).

Figure 2:
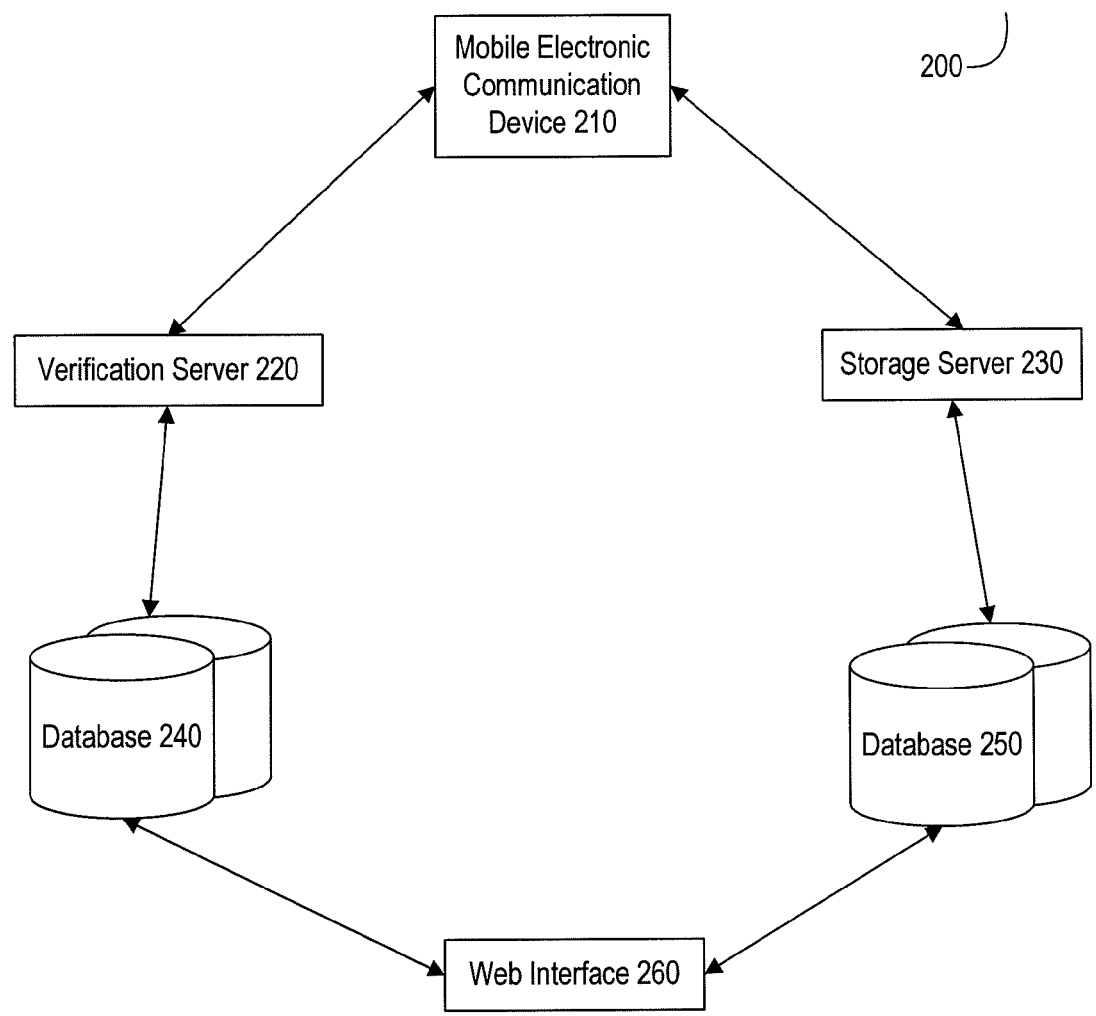
FIG. 2 illustrates a mobile data, device, and communications management system according to some embodiments.

FIG. 2 illustrates a system 200 for managing mobile data, devices, and communications according to some embodiments. System 200 includes mobile electronic communication device (mobile device) 210, verification server 220, storage server 230, database 240, database 250, and web interface 260. As the arrows in FIG. 2 indicate, the various components of system 200 may interact, for example, by providing or receiving information.

Verification server 220 is a type of server, such as server 150, described with reference to FIG. 1, that additionally delivers services related to the verification of data. For example, verification server 220 may verify a mobile device user's identity using identification data provided by the mobile device user. Storage server 230 is also a type of server, such as server 150, that additionally delivers services related to the storage and retrieval of users' mobile data. For example, storage server 230 may store and retrieve from a database, data such as mobile device users' profile data (e.g. user communication profiles, user privacy profiles, and OEM and user-defined profiles), user contact data, user calendar data, user authorized theft protection measures, and timing data. Database 240 is a database that stores and makes accessible, data that may be used to identify mobile device users associated with system 200 (e.g user identification data). Database 250 is a database that stores and makes accessible users' mobile data. The data stored on and made accessible by database 250 may be used for such tasks as: the management of incoming, outgoing, and missed communications; the management of unwanted communications; interfacing with e-mail and/or calendar applications via a plug-in application; mobile data synchronization and migration; mobile device usage monitoring and theft protection; and communication scheduling. Web interface 260 is a user interface, such as a web page on the world wide web, from which data stored on databases such as database 240 and database 250 may be accessed and/or manipulated.

Creation and Application of User Profiles

Figure 3:
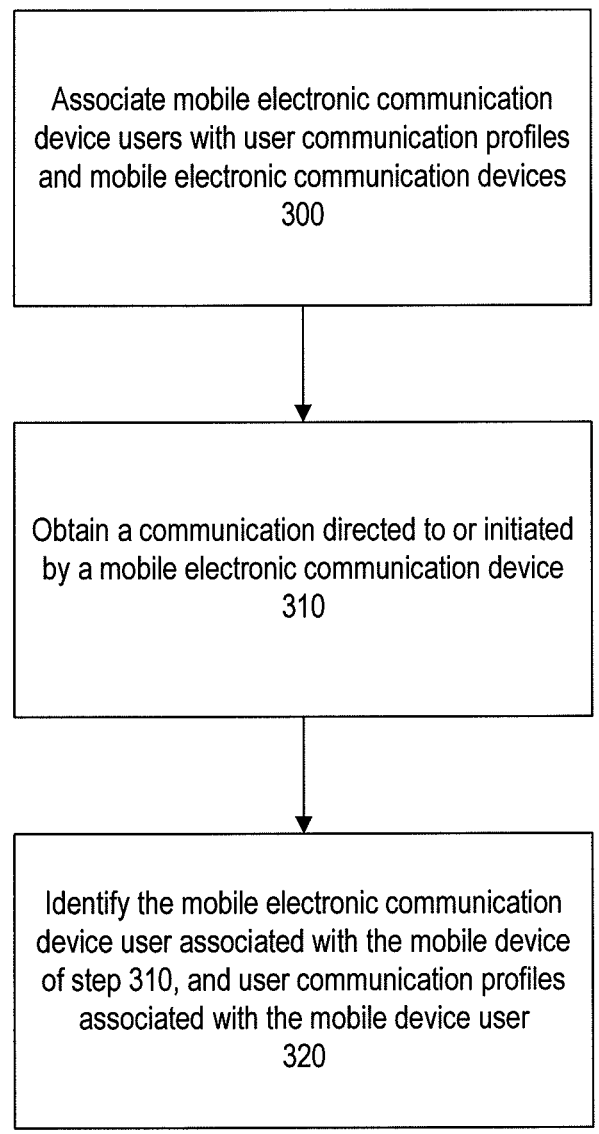
FIG. 3 illustrates a method for managing mobile data, devices and communications according to some embodiments involving the creation and application of profiles.

FIG. 3 illustrates a method for managing mobile data, devices and communications, according to some embodiments. As shown in FIG. 3, mobile device users may be associated with user communication profiles and mobile devices (step 300). In some embodiments, the association may be performed by utilizing one or more processors and/or memory devices associated with one or more mobile devices and/or servers involved in the management of mobile communications. In step 310, a communication, such a phone call or SMS message, directed to or initiated from a mobile device, may be obtained. In some embodiments, an application executing on a processor associated with the mobile device and/or an application executing on a server involved in managing the mobile device and its communications may retrieve or receive the communication. In step 320, the mobile device user associated with the obtained communication, and user communication profiles associated with the mobile device user are further identified. In some embodiments, the mobile device user to whom the communication is directed or from whom the communication originated, may be identified by examining attributes of the communication itself, such as the header information. Such information may then be matched with user identification data stored on a database involved in the management of the mobile device user's mobile communications. In such embodiments, user communication profiles associated with the identified mobile device user may thereafter be identified using one or more databases that associate mobile device users with their profile data. According to various embodiments, one or more of the identified user communication profiles may subsequently be applied to the obtained communication. Applying the identified communication profile to the obtained communication may thereafter result in the communication being, for example, received, forwarded to voicemail, diverted to a third party, or missed.

In various embodiments, communications directed to or initiated by mobile devices may be obtained by utilizing one or more communication networks, including, for example, wired networks, wireless networks, or a combination of different wired and wireless networks. Such communication networks may further involve technologies including infra-red, Bluetooth®, Wi-fi, GPRS®, EDGE®, HSDPAO, 3G®, WIMAX®, fiber optics, or computer networking technologies such as Ethernet technologies.

According to some embodiments, a user may create different user communication profiles for use at times when the user is engaged in particular types of activities, and would like his/her mobile communications managed according to some preselected guidelines. According to such embodiments, the user may create, for example, a profile that may be applied: when he/she is at a meeting (e.g. a "Meeting" profile), when he/she is on an airplane (e.g. an "Airplane" profile), when he/she is busy (e.g. a "Busy" profile), and when he/she is outdoors (e.g. an "Outdoor" profile). In some embodiments, a mobile device user may also create custom communication profiles to reflect the type of response he/she wishes to elicit from his/her mobile device (e.g "Silent," "Loud," "Vibrate only," and "Beep once" profiles). Users may also create custom user communication profiles applicable to any other situation and/or purpose.

A "Silent" user communication profile, in some embodiments, may comprise, for example, a first option that toggles the vibrator of a user's mobile device between its on/off settings. The silent profile may also comprise a second option that further comprises directives to: (1) do nothing (this may be the default mobile setting); (2) allow calls only from the user's contacts and/or specific contacts/numbers specified by the user; and (3) disallow calls from specific contacts/numbers specified by the user. The second option may also comprise directives to disconnect calls after a specified and/or variable number of rings and present the caller with voicemail, for all calls, for calls from callers not included in the user's contacts, and/or for calls from specific contacts/numbers specified by the user. Additionally, the second option may also comprise directives to forward calls to a user-defined number after a specified and/or variable number of rings, for all calls, for callers that are not included within the user's contacts, and/or for calls from specific contacts/numbers specified by the user. In some embodiments, one or more of the above options may be manually or automatically selected before the "Silent" profile is applied to a communication.

A "Meeting" user communication profile, in some embodiments, may comprise, for example, a first option that results in one or more of: (1) toggling the vibrator of a user's mobile device between its on/off settings, (2) toggling the ringer of the mobile device between its on/off settings, and (3) setting a custom voicemail message for application to calls. The meeting profile may also comprise a second option that further comprises directives to (1) do nothing (this may be the default mobile setting); (2) allow calls only from the user's contacts and/or specific contacts/numbers specified by the user; (3) disallow all calls or calls from user specified contacts and/or numbers; (4) disconnect calls after a specified and/or variable number of rings and present the caller with voicemail, for all calls, for calls from callers not included in the user's contacts, and/or for calls from specific contacts and/or numbers specified by the user; and (5) forward all calls to a user defined number after a specified and/or variable number of rings, for all calls, for callers not included within the user's contacts, and/or for calls from specific contacts/numbers specified by the user. In some embodiments, one or more of the above options may be manually or automatically selected before the "Meeting" profile is applied to a communication.

An "Airplane" user communication profile, in some embodiments, may comprise, for example, a first option that results in invoking a custom voicemail message. The airplane profile may also comprise a second option that further comprises directives to (1) do nothing (this may be the default mobile setting); (2) disallow the forwarding of calls to voicemail for calls that are not from a user's contacts, and/or for calls from specific contacts/numbers specified by the user; (3) forward calls to the user's default voice mail for all calls, for calls that are from callers included within the user's contacts, and/or for calls from specific contacts/numbers specified by the user; and (4) forward calls to the user's custom voice mail, for all calls, for calls from callers included within the user's contacts, and/or for calls from specific contacts/numbers specified by the user. In some embodiments, one or more of the above options may be manually or automatically selected before the "Airplane" profile is applied to a communication.

According to various embodiments, users may also create and/or use "Custom" profiles, that fit particular user needs. A custom profile may comprise, for example, a first option that directs that (1) a mobile device's vibrator be toggled between its on and off settings; (2) the mobile device's ringer be toggled between its on and off settings; (3) the mobile device ring only once if its ringer is turned on; and (4) a custom voicemail message be used. The custom profile may also comprise a second option that further comprises directives to (1) auto-answer all calls after a specified and/or variable number of rings, auto-answer calls from a user's contacts after a specified number of rings, and/or auto-answer calls from specific contacts/numbers after a specified number of rings; (2) allow calls only from callers included within the user's contacts, and/or from specific user contacts/numbers specified by the user; (3) disconnect calls after a specified and/or variable number of rings and present the caller with voicemail, for all calls, for calls from callers not included in the user's contacts, and/or for calls from specific contacts and/or numbers specified by the user; (4) forward calls to a user defined number after a specified and/or variable number of rings, for all calls, for callers that are not included within the user's contacts, and/or for calls from specific contacts/numbers specified by the user; and (5) initiate a call-back (after auto-disconnect) for all calls, for calls from callers included within the user's contacts, and/or for calls from specific contacts and/or numbers specified by the user.

According to various embodiments, the method of FIG. 3 may further comprise using a user interface to obtain a computer representation of a meeting, and facilitating the creation of associations in a memory device, such as a database involved in the management of mobile communications. The associations may include, for example, an association between the obtained representation of the meeting and one or more user communication profiles, an association between the obtained meeting and a user calendar, and an association between the user calendar and a mobile device user. In many embodiments, meetings may be further associated with other user mobile data, for example, user contacts, tasks, to-do lists, alarms, and memos. In various embodiments, a computer representation of a meeting may comprise, for example, a data structure in a memory that stores attributes of a real-world meeting. Such attributes may include, for example, a date, a start time, an end time, a location, additional notes, a subject, data identifying meeting participants, and other details. In many embodiments, a user calendar may comprise, for example, a computer representation of a calendar. A computer representation of a calendar may further comprise a data structure in a memory that stores, for easy accessibility, attributes of a real-world calendar, including one or more specific years, months associated with the years, weeks associated with the months, days associated with the weeks, and hours associated with the days. According to some embodiments, the user interface may be part of any application with e-mail and/or calendar capabilities (e.g. MS-Outlook, Yahoo Calendar, Yahoo Mail, Google Calendar, GMail) which may be communicatively coupled to one or more servers involved in the management of mobile data, devices and/or communications, via a custom-built or commercially available plug-in application.

In various embodiments, the method of FIG. 3 may further involve identifying user communication profiles for application to an obtained incoming communication by identifying, in a memory device, a user calendar associated with the intended recipient or initiator of the obtained communication and a meeting associated with the user calendar. In some embodiments, the memory device may comprise a database associated with one or more servers involved in the management of mobile data, devices, and/or communications. One or more user communication profiles associated with the identified meeting may then also be identified for application to the obtained incoming communication. For example, if the intended recipient's calendar indicates that a meeting is scheduled, and an incoming communication is obtained during the duration of the meeting, a communication profile associated with the meeting may be selected to be applied to the incoming communication.

In various other embodiments, the method of FIG. 3 additionally comprises using a user interface to obtain a user contact, and to facilitate the creation of associations in a memory device. Such associations include, for example, an association between the obtained user contact and a mobile device user, and an association between one or more user communication profiles and the obtained user contact. Many such embodiments, further involve identifying user communication profiles for application to an obtained communication by identifying, in a memory device, a user contact associated with the sender or intended recipient of the obtained communication, and selecting one or more user communication profile associated with the identified user contact, for application to the obtained incoming communication. In such embodiments, the memory device may comprise, for example, a database associated with one or more servers involved in the management of mobile data, devices and/or communications.

According to other embodiments, identifying user communication profiles for application to an obtained communication may entail determining that the obtained communication is a missed communication intended for a particular recipient mobile device user, identifying, in a memory device, a user contact associated with the recipient mobile device user, and selecting one or more communication profiles associated with the identified user contact for application to the missed communication. The user contact may be identified in the memory device based on, for example, a relationship between the user contact and the sender of the missed communication. Examples of such relationships include relationships based on associated telephone numbers (e.g. the identified user contact and the sender of the missed communication having identical telephone numbers), and relationships based on a similar association with the recipient mobile device user (e.g. the sender and the identified user contact are both business contacts of the recipient mobile device user).

Figures 3A, 3B:
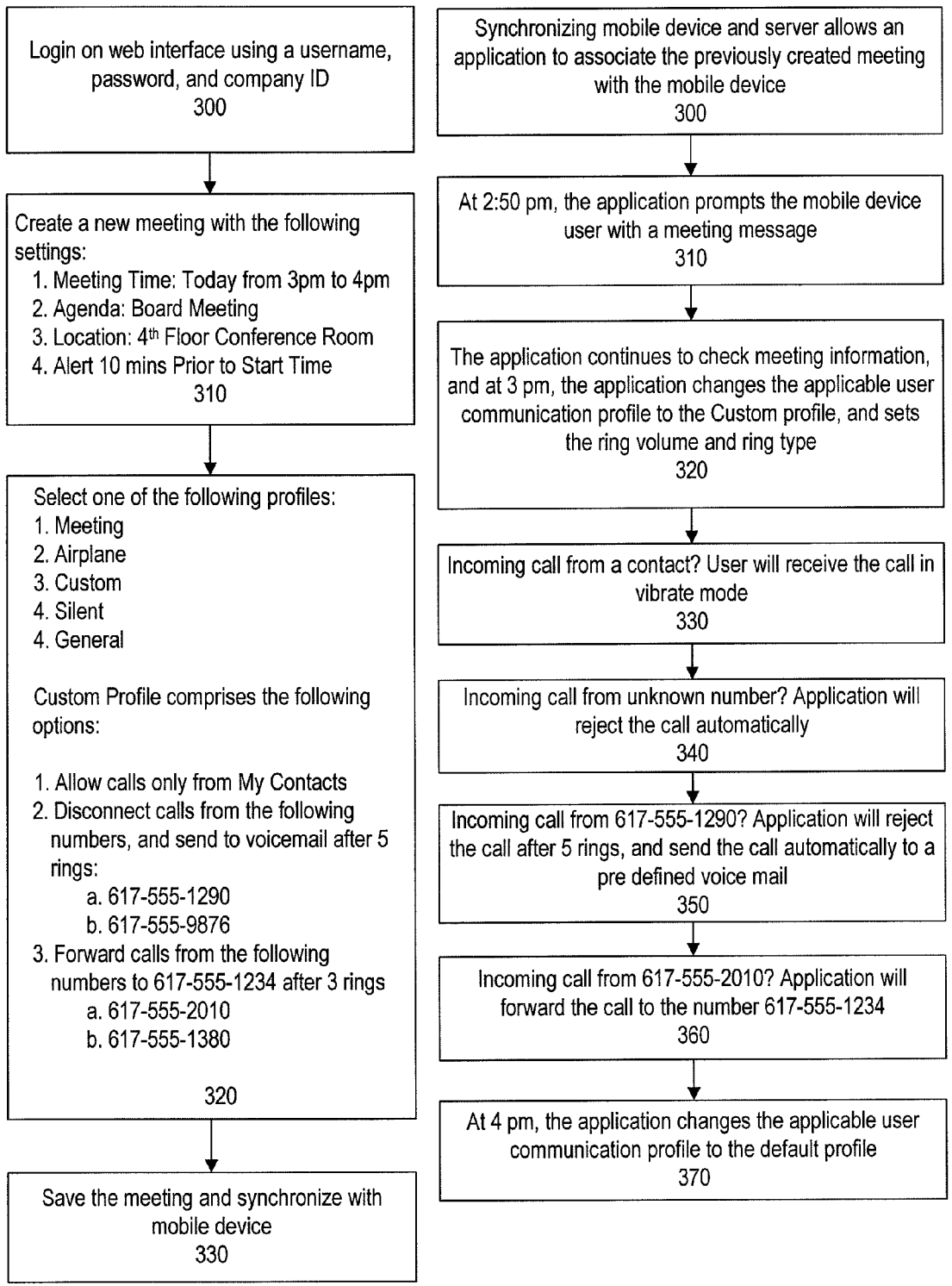
FIGS. 3A and 3B illustrate methods for managing mobile data, devices, and communications, according to exemplary embodiments.

FIGS. 3A and 3B illustrate methods for managing mobile data, devices, and communications, according to exemplary embodiments. As illustrated in FIG. 3A, in step 300, a user may login on a web interface, such as a website, by providing identifying information such as a username, password, and company ID. In other embodiments, the user may alternatively gain access to an e-mail and/or calendar application (e.g. MS-Outlook) that is communicatively coupled to a server involved in managing the user's mobile data, devices, and/or communications through a custom-built plug-in application. The user may then, as shown in step 310, create a new meeting and specify particular settings such as a meeting time, agenda, location and an alert time. In many embodiments, the new meeting may be associated with a calendar associated with the user. In step 320, the user may select a user communication profile, such as the custom profile, to associate with the new meeting. The custom profile may provide that only calls from the user's list of contacts are to be allowed, that calls from certain numbers are to be disconnected after 5 rings, and that calls from certain other numbers are to be forwarded to a specified number after 3 rings. In step 330, the user may, using a server involved in management of mobile data, devices, and/or communications, save the new meeting to a database associated with the server. The user may thereafter synchronize his mobile device with the server.

In a related embodiment illustrated in FIG. 3B, a step 300 illustrates a possible effect of synchronizing the mobile device user's mobile device with the server involved in managing the user's mobile data, devices, and/or communications. Such synchronization may allow an application, such as an application executing on the server or the mobile device, to associate the previously created meeting (in step 310 of FIG. 3A) with the mobile device that will be present with the user for the duration of the meeting. In some embodiments, such an association may be created by saving the previously created meeting and the associated calendar on a memory device accessible to the mobile device. Step 310 of FIG. 3B illustrates the activation of the alert time previously set in step 310 of FIG. 3A. At 2:50 pm (10 minutes prior to the start time of the meeting), the application prompts the mobile device user with a message related to the upcoming meeting. As shown in step 320 of FIG. 3B, the application then continues to monitor meeting information, and at 3:00 pm (meeting start time), the application changes the applicable user communication profile to the custom profile previously associated with the meeting. The application may also appropriately adjust the ring volume and ring type. Steps 330-360 of FIG. 3B illustrate the reaction of the user's mobile device to incoming calls, based on the applicable custom profile, while the meeting is ongoing. In step 330, the mobile device encounters an incoming call from a caller who is on the user's contacts list, and the user receives the call in vibrate mode. In step 340, the user's mobile device encounters a call from an unknown number, such as a number that is not present in the user's contacts and has not been identified by the user in the applicable communication profile. In such cases, the application rejects the call automatically. In step 350, the mobile device encounters a call from the number '617-555-1290', and the application rejects the call after 5 rings and sends the call automatically to a predefined voice mail. And in step 360, the mobile device encounters a call from '617-555-2010' and the application forwards the call to the number '617-555-1234'. Lastly, as illustrated in step 370, at 4 pm (meeting end time), the application changes the applicable communication profile back to a default profile.

Use of Plug-in Applications in Mobile Communications Management

Figure 4:
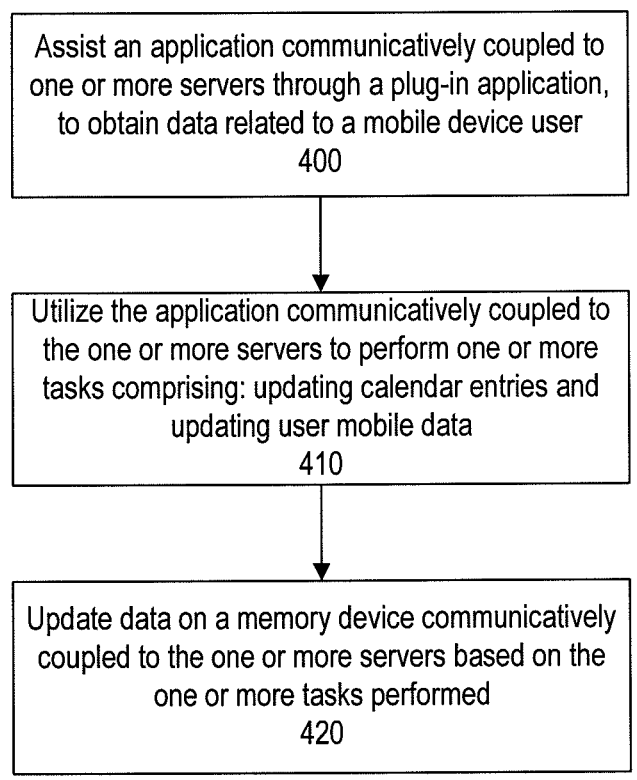
FIG. 4 illustrates a method for managing mobile data, devices, and communications according to some embodiments involving the use of plug-in applications in mobile communications management.

FIG. 4 illustrates a method for managing mobile data, devices, and/or communications, according to some embodiments. In step 400, a plug-in application assists an application, communicatively coupled to one or more servers through the plug-in application, to obtain data related to a mobile device (e.g. profile data, user contacts, and call logs). In many embodiments, the one or more servers are involved in the management of the mobile device, data related to the mobile device and/or communications related to the mobile device. The plug-in application, in various embodiments, comprises any software application that interfaces with a second software application in order to add functionality to the second software application. The application communicatively coupled to the one or more servers through the plug-in application may be, according to some embodiments, an application that comprises e-mail and/or calendar functionality. For example, the plug-in application of step 400 may be a custom-built plug-in for MS-Outlook, that provides to the MS-Outlook user, the additional functionality of being able to access and manipulate his/her mobile data. Such data may not be generally accessible to MS-Outlook users who have not installed the custom-built plug-in software.

In step 410, the application communicatively coupled to the one or more servers through the plug-in application is utilized to perform one or more tasks. These tasks may comprise adding, deleting and/or updating mobile data, for example, calendar data and contact data associated with mobile users. Such tasks may be performed by mobile device users whose mobile data, devices, and/or communications are being managed by the one or more servers.

In step 420, data on a memory device, such as a database that is communicatively coupled to the one or more servers, is updated based on the one or more tasks performed. For example, in some embodiments, after a user adds a calendar entry, such as a meeting, to his/her calendar using the e-mail and/or calendar application, a database that is utilized by the one or more servers to manage the user's mobile data, devices, and/or communications, may be updated with the newly added calendar entry. Additionally, in such embodiments, a subsequent synchronization of the user's mobile device with the one or more servers may result in all the information created or modified by the user through the use of the e-mail and/or calendar application, being available on or otherwise accessible to the user's mobile device.

According to some embodiments, a user utilizing an application with e-mail and/or calendar capabilities that is communicatively coupled to one or more servers involved in managing the user's mobile data, devices and/or communications may also be able to alter communication profiles associated with previously created meetings. According to some embodiments, if an alteration is made to a profile associated with a meeting, while the meeting is in progress, the alterations may not be adopted by the user's mobile device.

A user may also, according to various embodiments, utilize the application with e-mail and/or calendar capabilities to schedule a communication, such as a conference call, and associate the communication with a scheduled meeting in the user's calendar. In such embodiments, an application executing on the user's mobile device or on one or more servers involved in the management of the user's mobile data, devices, and/or communications, may prompt the user to initiate the conference call and/or automatically dial number(s) associated with the scheduled communication. In embodiments where a user schedules a communication, such as a conference call that requires dialing a bridge number followed by a pass code, an application executing on the user's mobile device may prompt the user for permission to automatically dial the bridge number and pass code, as well as automatically enter any identification information that may be necessary in order to enter the conference call. Moreover, in some embodiments, if a scheduled communication, such as a phone call, requires that the user play an audio recording, the user may attach an audio file to the scheduled communication and the audio file may automatically be played at a particular user-defined time during the scheduled call.

According to further embodiments, a user utilizing an application with e-mail and/or calendar capabilities that is communicatively coupled to one or more servers involved in managing the user's mobile data, devices and/or communications, may schedule various tasks. Such tasks may, for example, (1) remind the user to communicate with someone by, for example, prompting the user to dial a preselected number; (2) have associated profiles, such as communication profiles and privacy profiles; (3) allow the user to specify recipient e-mail addresses, phone numbers, and/or message contents associated with an outgoing communication, and result in the opening of an e-mail or SMS editor displaying such information on the user's mobile device at a appropriate time; (4) automatically send one or more e-mail and/or SMS messages at a pre-defined time from the user's mobile device (e.g. a task that results in sending a birthday SMS message to the user's friend on the friend's birthday); and (5) invoke an alarm on the user's mobile device. In many embodiments, when a task defined by the user has been completed, the task may be automatically marked as such (e.g. with a "Completed" tag).

In various other embodiments, a user may receive assistance from the one or more servers involved in the management of the user's mobile data, devices and communications, while the user is engaged in various activities. For example, a user who needs to drive to an off-site meeting may schedule a calendar event/task with the relevant information, such as the destination address and meeting time. In such embodiments, the one or more servers involved in managing the user's mobile data, devices, and communications, may automatically calculate the time required to reach the destination, and at an appropriate time, prompt the user using the user's mobile device, to start his/her journey. The one or more servers may utilize GPS or other location-related technologies to provide the user with directions to his/her destination.

In some other embodiments, a user may define, using an e-mail and/or calendar application communicatively coupled to one or more servers involved in managing the user's mobile data, devices, and/or communications, a sensitive calendar event that may automatically trigger the user's mobile device to record the user's communications. The file(s) containing the recorded communications may subsequently be linked to the calendar event, for easy retrieval. According to some embodiments, a mobile device user may be able to apply a communication profile to a calendar event that covers a duration during which the user may be traveling outside of the country or be away on a long vacation. According to other embodiments, a mobile device user may associate with a scheduled calendar task, event, and/or communication, a time-out or other termination means, in order to facilitate ending the task, event and/or communication. In such embodiments, the time-out or other termination means may trigger dummy calls on the user's mobile device at regular intervals. The dummy calls or other interrupting activity may be defined and/or configured by a mobile device user within the calendar task, event and/or communication itself.

Figure 5:
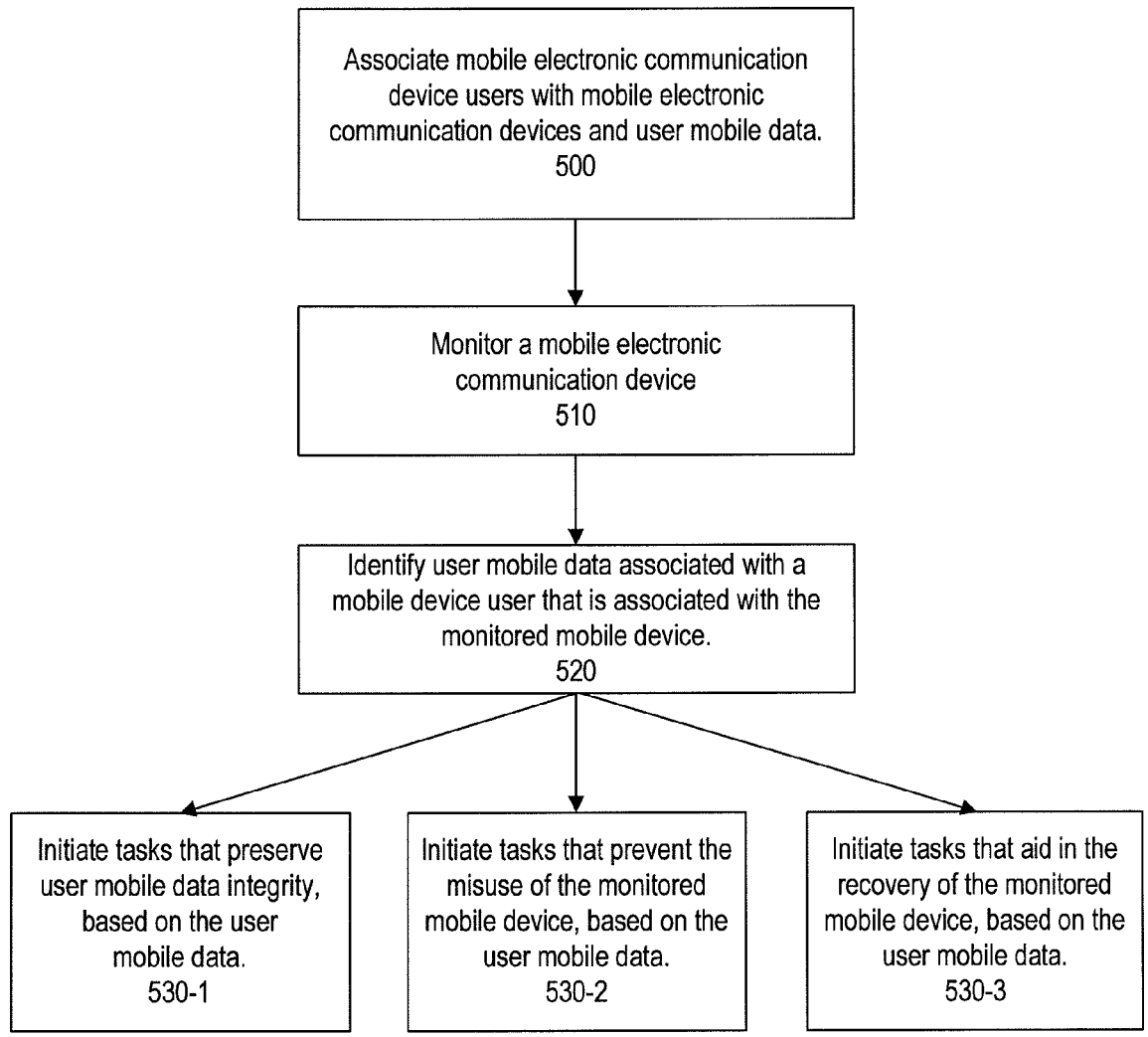
FIG. 5 illustrates a method for managing mobile data, devices, and communications according to some embodiments that involve the detection of lost/stolen mobile devices, and the protection and retrieval of mobile devices and data.

Detection of Lost/Stolen Mobile Devices, and Protection and Retrieval of Lost/Stolen Mobile Devices and Data FIG. 5 illustrates a method for managing mobile data, devices, and/or communications, according to some embodiments. In step 500, mobile device users are associated with mobile devices and mobile data. According to some embodiments, this association may be made in a memory device, by a processor. In step 510, a mobile device is monitored, and the monitoring may comprise one or more of: monitoring the usage of the mobile device to detect changes in usage patterns, and monitoring ambient data obtained from the mobile device. Usage patterns may comprise patterns associated with parties contacted using the mobile device and patterns associated with the duration of communications involving the mobile device. Ambient data obtained from the mobile device may comprise audio and video data captured using the mobile device, and location data related to the mobile device. In various embodiments, monitoring the mobile device may result in a determination that the mobile device is likely to have been lost and/or stolen.

In step 520, mobile data associated with a mobile device user, who is in turn associated with the monitored mobile device, is identified. In various embodiments, the mobile data may be identified in a memory device, such as a database accessible to one or more servers involved in managing the mobile data, the monitored mobile device, and/or associated communications. In some other embodiments, the mobile data may be identified in a memory device stored on or otherwise accessible to the monitored mobile device.

As illustrated by FIG. 5, steps 530-1 through 530-3 comprise initiating tasks based on the identified mobile data. According to various embodiments, the user's mobile data may comprise, in addition to other types of data, data indicative of user authorized theft protection measures, and the tasks associated with steps 530-1 through 530-3 may be initiated based on such data. In some embodiments, the data indicative of user authorized theft protection measures may be included within profile data associated with the user, and may be configurable by the user.

Step 530-1 involves initiating tasks that preserve the integrity of mobile data associated with a mobile device that is presumed to be lost and/or stolen. According to various embodiments, tasks that preserve mobile data integrity comprise (1) making a backup of all or a subset of user mobile data (e.g. user contacts, calendar data, SMS/MMS/e-mail, photos, audio and video data) stored on the monitored mobile device, and deleting the mobile data from the monitored mobile device afterwards, (2) preventing data transfer from and/or to the monitored mobile device by, for example, blocking connections (e.g. USB, Bluetooth, and Wi-Fi based connections) to all electronic devices, (3) clearing call logs stored on the monitored mobile device, and (4) formatting the monitored mobile device's memory card. In many embodiments, tasks that preserve the integrity of mobile data may incorporate cross device and cross platform functionality.

Step 530-2 involves initiating tasks that prevent misuse of the monitored mobile device. Such tasks, according to various embodiments, comprise (1) blocking all or a subset of outgoing communications (e.g. blocking the initiation of international or '900' calls), from the monitored mobile device, (2) disabling the monitored mobile device, (3) resetting passwords associated with soft and/or hard resets of the monitored mobile device, (4) rejecting the insertion of a new SIM card on the monitored mobile device, (5) blocking internet access from the monitored mobile device, (6) locking the monitored mobile device's phone and/or network settings, and (7) blocking all incoming communications directed to the monitored mobile device. According to many embodiments, outgoing and incoming communications comprise text messages, e-mail messages, and phone calls. In many embodiments, tasks that prevent misuse of the monitored mobile device may incorporate cross device and cross platform functionality.

Step 530-3 involves initiating tasks that aid in the recovery of the monitored mobile device. Such tasks, according to various embodiments, comprise directing all incoming and outgoing communications from the monitored mobile device to a predefined electronic communication device. For example, if the unauthorized user tries to dial a particular number, the monitored mobile device may appear as if it is dialing the particular number, although it is actually dialing a different number associated with a predefined electronic communication device. According to various other embodiments, tasks that aid in the recovery of the monitored mobile device may further comprise (1) recording and obtaining communications made using the monitored mobile device, (2) causing the monitored mobile device to capture images and/or video at regular intervals and retrieving such photos, (3) tracking the location of the monitored mobile device, and (4) tracking the keystrokes made on the monitored mobile device. Communications made using the monitored mobile device may be obtained by retrieving or receiving from the mobile device, audio files in a variety of formats, including .pcm and .avi. Tracking the location of the mobile device may be accomplished using technologies, including GSM/CDMA point (cell tower) locators, and GPS locator technology. In some embodiments, tasks that aid in the recovery of the monitored mobile device may include remotely controlling, viewing and/or synchronizing the mobile device from various devices and/or tools, including mobile devices, web interfaces, and computer terminals. In many embodiments, tasks that aid in the recovery of the monitored mobile device may incorporate cross device and cross platform functionality.

Figure 6:
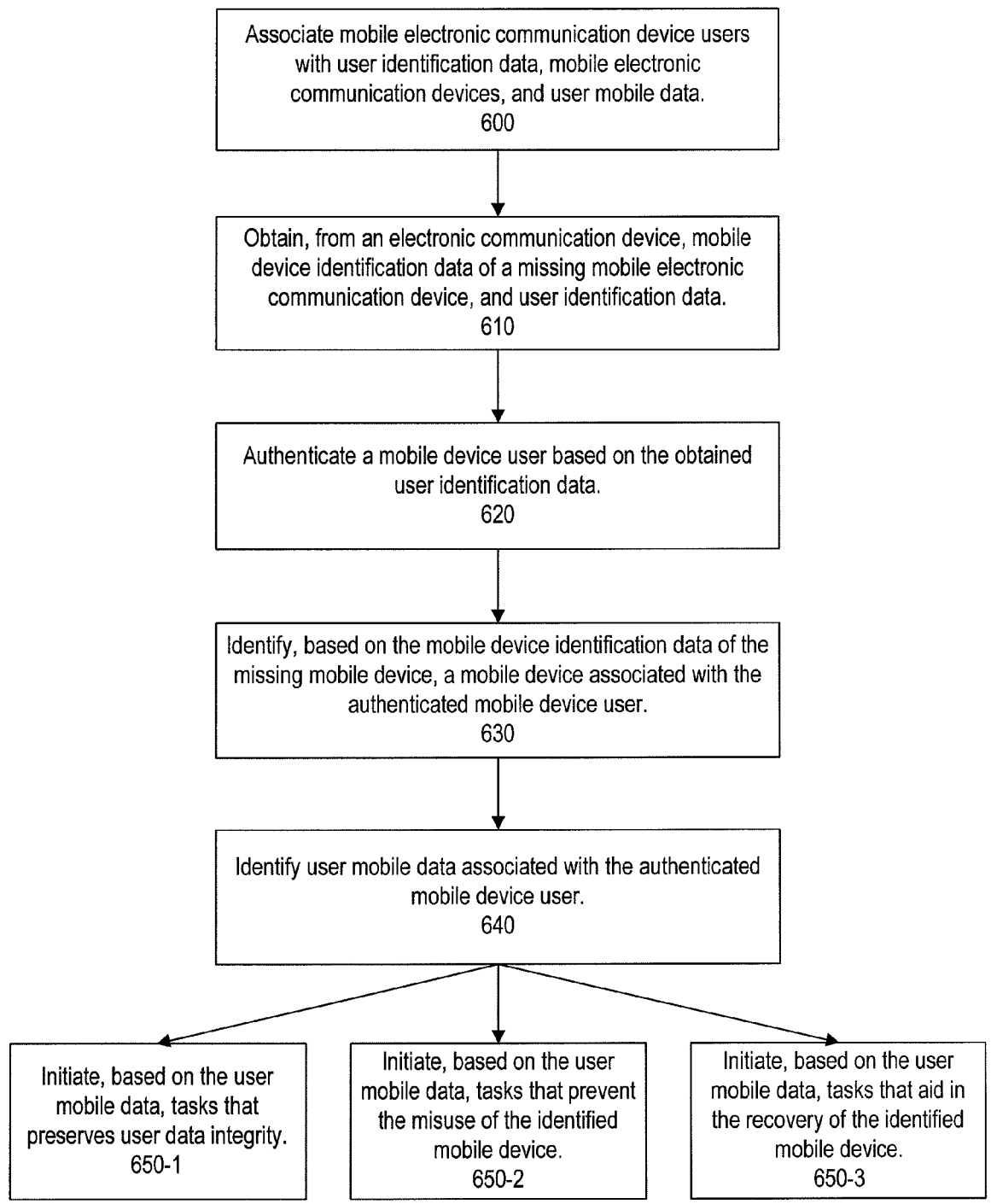
FIG. 6 illustrates another method for managing mobile data, devices, and communications according to some embodiments that involve the detection of lost/stolen mobile devices, and the protection and retrieval of mobile devices and data.

FIG. 6 illustrates a method for managing mobile devices, data, and/or communications, according to some embodiments. In step 600, mobile device users are associated with user identification data, mobile devices, and mobile data. According to some embodiments, these associations may be made in a memory device, by a processor. In step 610, mobile device identification data of a missing mobile device as well as user identification data may be obtained from an electronic communication device. According to some embodiments, the user of a missing mobile device may provide the mobile device identification data of the missing mobile device, using a web-based graphical user interface. The mobile device identification data of the missing mobile device may comprise, in some embodiments, a device identification number and/or other data that serves to uniquely identify the missing mobile device.

Figure 6A:
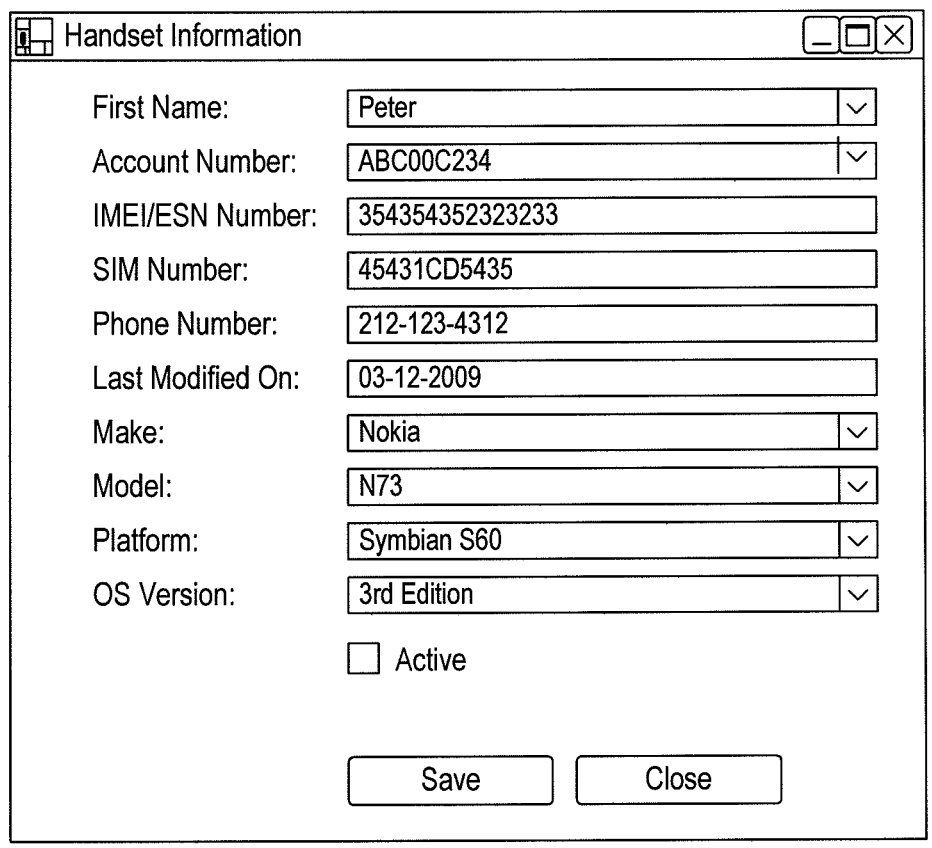
FIG. 6A illustrates examples of mobile device identification data.

FIG. 6A illustrates examples of mobile device identification data.

Step 620 entails authenticating a mobile device user based on the user identification data. According to some embodiments, authenticating the mobile device user based on the user identification data involves verifying that a combination of data, such as a device identification number, a phone number and an account number, for example, are associated with a mobile device user in a database. In some embodiments, the phone number and account number may be optional parameters that may not be used for authentication purposes.

Step 630 involves identifying, based on the obtained mobile device identification data of the missing mobile device, a mobile device associated with the authenticated user. In some embodiments, this identification may involve searching, within a memory device, for a mobile device that is both associated with the authenticated user and has attributes (e.g. device identification number, phone number and platforms supported) that match the mobile device identification data of the missing mobile device. In various embodiments, such a search may be performed within a database that maintains associations between the authenticated user and his/her mobile devices.

Step 640 further involves identifying mobile data associated with the authenticated mobile device user. According to various embodiments, the authenticated user's mobile data may comprise, in addition to other types of data, data indicative of user authorized theft protection measures, and the tasks associated with steps 650-1 through 650-3 may be initiated based on such data. In some embodiments, the data indicative of user authorized theft protection measures may be included within profile data associated with the authenticated user.

Step 650-1 entails initiating tasks that preserve mobile data integrity, step 650-2 entails initiating tasks that prevent the misuse of the identified (missing and/or stolen) mobile device, and step 650-3 entails initiating tasks that aid in the recovery of the identified (missing and/or stolen) mobile device.

Figure 6B:
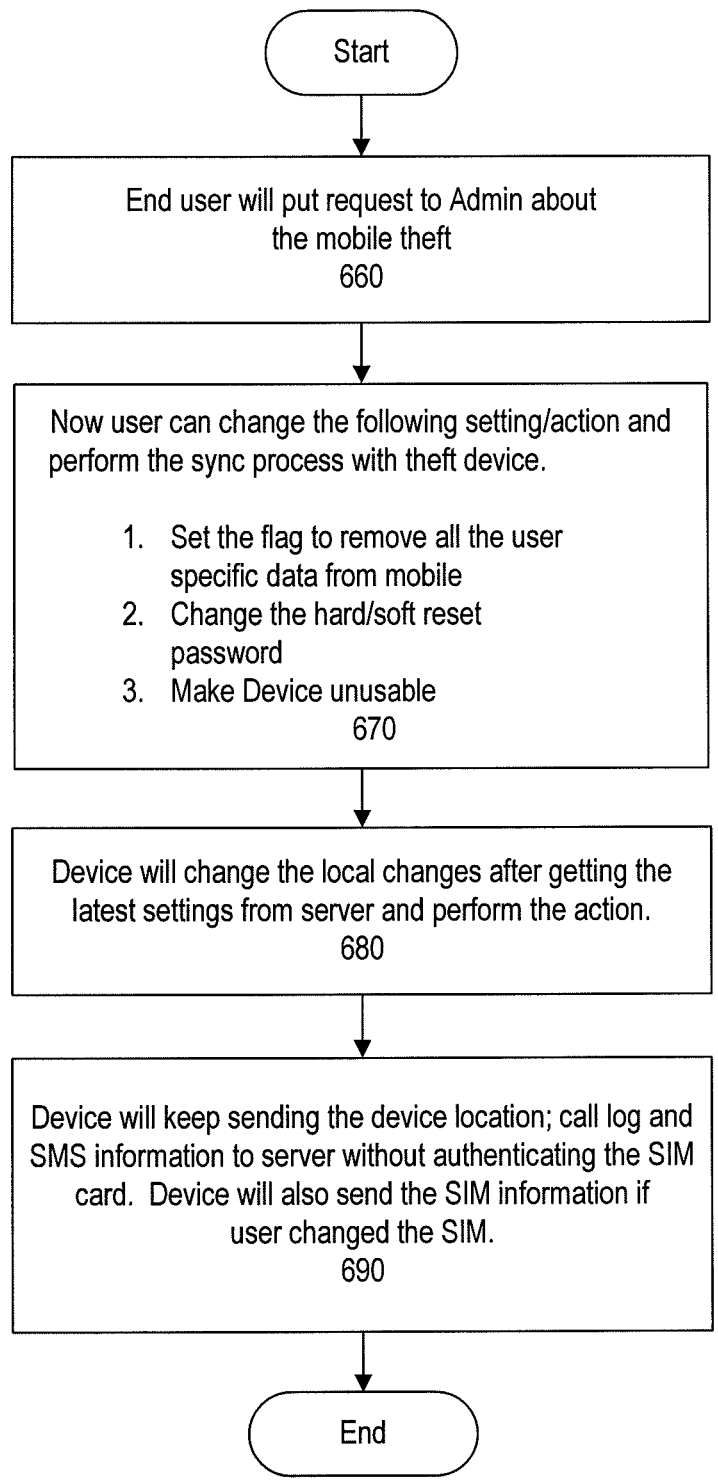
FIG. 6B illustrates another method for managing mobile data, devices, and communications according to some embodiments that involve the detection of lost/stolen mobile devices, and the protection and retrieval of mobile devices and data.

FIG. 6B illustrates another embodiment that relates to managing missing and/or stolen devices, and related mobile data. In step 660, an end-user, such as a mobile device user, puts in a request to an administration regarding mobile theft. In step 670, the end-user is able to change the following settings/actions: (1) set the flag to remove all the user specific data from the stolen mobile device; (2) change the hard/soft reset password; and (3) make the mobile device unusable. In step 680, the stolen mobile device will change the local settings after getting the latest settings from one or more servers involved in the management of the device, its data, and/or its communications. It will also perform the actions specified in step 670. In step 690, the stolen mobile device will keep sending its device location, call log and SMS information to the one or more servers without authenticating its SIM card. If the stolen mobile device's SIM card has been changed, the device will also send the new SIM information to the one or more servers.

Data Synchronization

Figure 7:
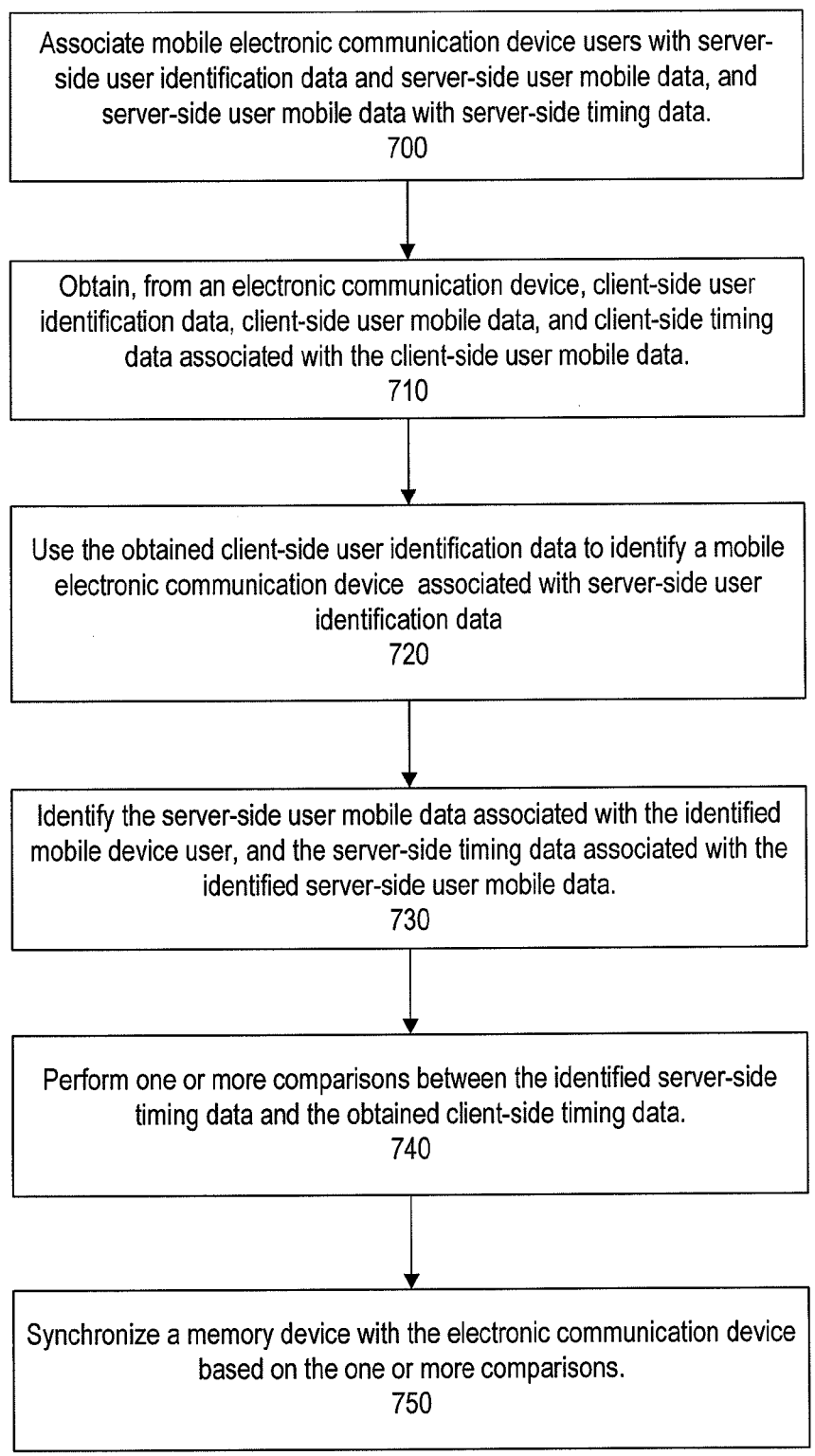
FIG. 7 illustrates a method for managing mobile data, devices, and communications according to some embodiments that involve data synchronization.

FIG. 7 illustrates a method for managing mobile data, devices and/or communications, according to some embodiments. In step 700, mobile device users are associated with server-side user identification and user mobile data, and server-side user mobile data is associated with server-side timing data. Such associations may be made in a memory device, such as a database, accessible to one or more servers involved in managing the mobile device user's mobile devices, mobile data, and/or communications. 'Server-side' data, as used herein, refers generally to data that a server has some degree of control over.

Step 710 comprises obtaining, from an electronic communication device, client-side user identification data, client-side user mobile data, and client-side timing data associated with the client-side user mobile data. 'Client-side data,' as used herein, refers generally to data associated with a client device or program, that is not under the exclusive control of a server. Step 720 further involves using the obtained client-side user identification data to identify, in a memory device, a mobile device user associated with server-side user identification data. In many embodiments, the memory device may be a database accessible to one or more servers involved in managing the mobile device user's mobile data, devices, and/or communications. In step 720, for example, the mobile device user may be identified by querying the memory device for server-side user identification data that is identical to the obtained client-side user identification data. In step 730, server-side user mobile data associated with the identified mobile user is identified, and server-side timing data associated with the identified server-side user mobile data is also identified. Such identifications may be performed, for example, by the memory device, or by a processor based on information in the memory device. Step 740 further involves performing one or more comparisons using the identified server-side timing data and the obtained client-side timing data. For example, if the server-side mobile data includes a user contact that corresponds to a user contact in the client-side mobile data, then the one or more comparisons may include a comparison between the timestamp associated with the server-side user contact and the timestamp associated with the corresponding client-side user contact. In some embodiments, the one or more comparisons performed may be user configurable. In step 750, the memory device is synchronized with the electronic communication device based on the one or more comparisons performed. According to some embodiments, synchronizing the memory device with the electronic communication device (step 750) comprises, for each of the one or more comparisons performed, replacing, in the memory device, server-side user mobile data with corresponding client-side user mobile data, if a corresponding comparison of timing data resulted in a determination that the corresponding client-side user mobile data was more recently updated. Likewise, synchronizing also comprises, for each of the one or more comparisons performed, replacing, in the electronic communication device, client-side user mobile data with corresponding server-side user mobile data, if a corresponding comparison of timing data resulted in a determination that the corresponding server-side user mobile data was more recently updated.

In some embodiments, the user may be able to view a change history associated with changes made to client-side and/or server-side mobile data. In such embodiments, the availability of the change history may be configurable by the user. According to other embodiments, synchronizing also involves merging mobile data. For example, during synchronization, user mobile data stored on the electronic communication device may be merged with user mobile data stored on the memory device. Additionally, in many embodiments, synchronization of mobile data may be occur across different devices and/or mobile platforms.

According to a specific embodiment of the method of FIG. 7, whenever a user alters a user communication profile associated with his mobile device, a responsible server may be automatically notified of the change in profile and/or automatically requested to perform an update of a server-side database. The server may then update the server-side database to reflect the latest altered profile. The server may be contacted in various ways, for example, using HTTP, SMS, or through a WAP browser. If a mobile device user disables a feature allowing for the automatic notification and/or request, the automatic notification and/or request may not occur if the user's mobile device is appropriately updated. If, however, the mobile device is not appropriately updated, and the mobile device sends a notification and/or request to the server (despite the user having disabled the automatic notification and/or request feature), the server may ignore the notification and/or request without providing an error message back to the mobile device.

In another specific embodiment of the method of FIG. 7, a mobile device user may login to an application via a web interface using identifying information such as a username, password and company ID. Using the application, the user may access the user's calendar and view all previously created meetings associated with the user's calendar based on date, category, location, and priority. The user may also use the application to add and/or delete meetings from the calendar. Additions and deletions may be reflected to the user's mobile device during the next synchronization. The user may additionally update meetings using the application, and such updates may also be reflected to the user's mobile device during the next synchronization. Further, the user may add, delete and/or update user communication profiles associated with meetings on the user's calendar using the application. The added, deleted and updated data may be synchronized with the user's mobile device automatically so that the server-side data associated with the servers used to manage the user's mobile devices, data, and/or communications and the client-side data associated with the user's mobile device both reflect the most current data. In some embodiments, the user's calendar and profile data associated with the calendar may be configured into the user's mobile device itself.

In further specific embodiments, an application executing on the user's mobile device may configure the user's calendar data and profile data into the user's mobile device, and may apply the appropriate profile at the appropriate time to incoming and/or outgoing communications. For example, an application executing on the user's mobile device may apply a custom profile assigned to an incoming communication, when the user's calendar indicates that a meeting is scheduled for a particular time block, the custom profile is associated with the meeting, and the current time falls within that time block.

Figure 7A:
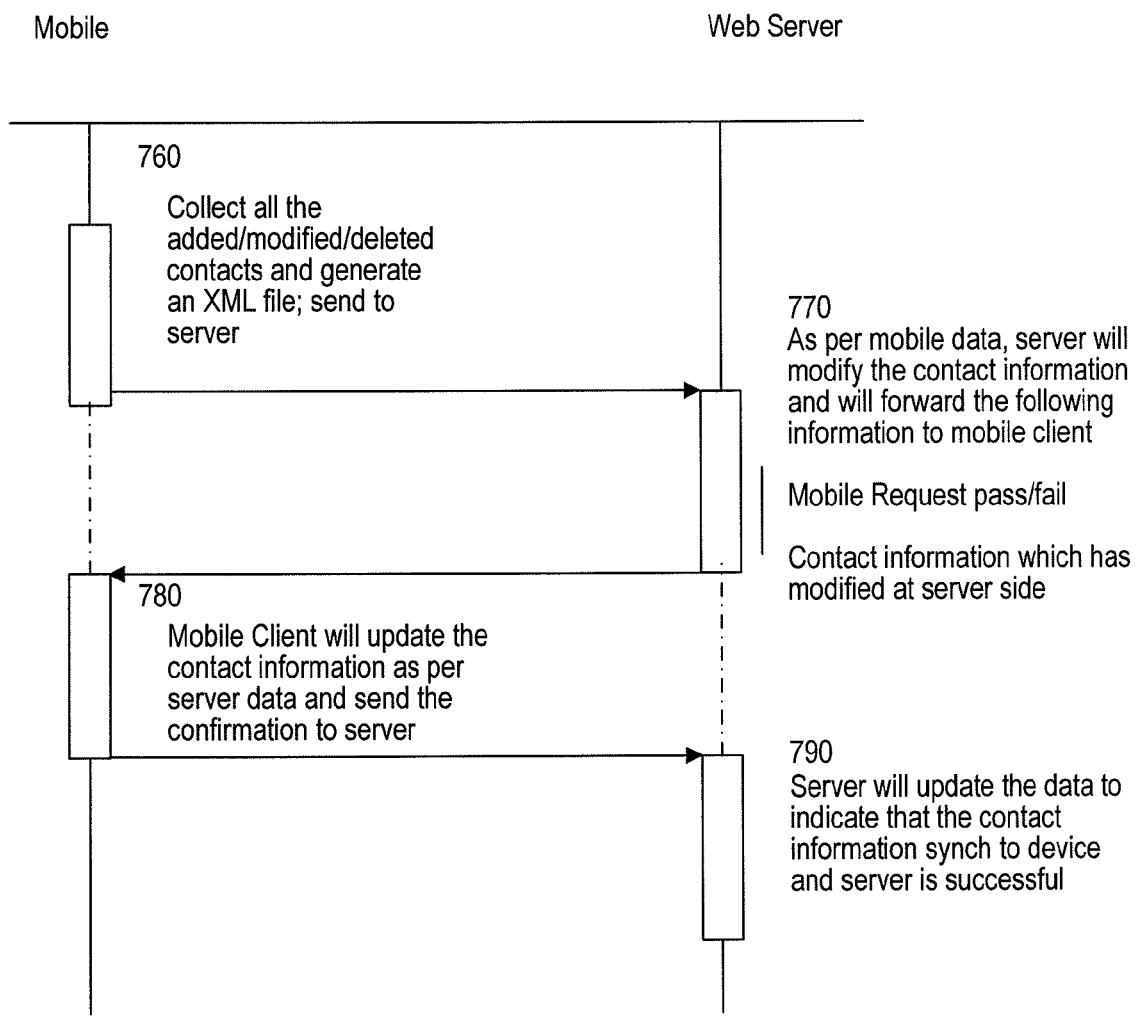
FIG. 7A illustrates another method for managing mobile data, devices, and communications according to a specific embodiment involving data synchronization.

FIG. 7A illustrates another specific embodiment relating to the synchronization of contact information associated with mobile device users. In step 760, a mobile client such as a mobile device collects all the added, modified and deleted user contacts and generates an XML file. The XML file is then sent to a web server involved in the management of the mobile client, its mobile data and/or communications. In step 770, the server modifies the user contact information according to the mobile data received, and forwards the following information to the mobile client: (1) mobile request pass/fail; and (2) contact information modified at the server. In step 780, the mobile client updates user contact data based on the server data and sends a confirmation to the server. In step 790, the server updates data to indicate that the synchronization of the contact data between the mobile client and the server was successful.

Figure 8:
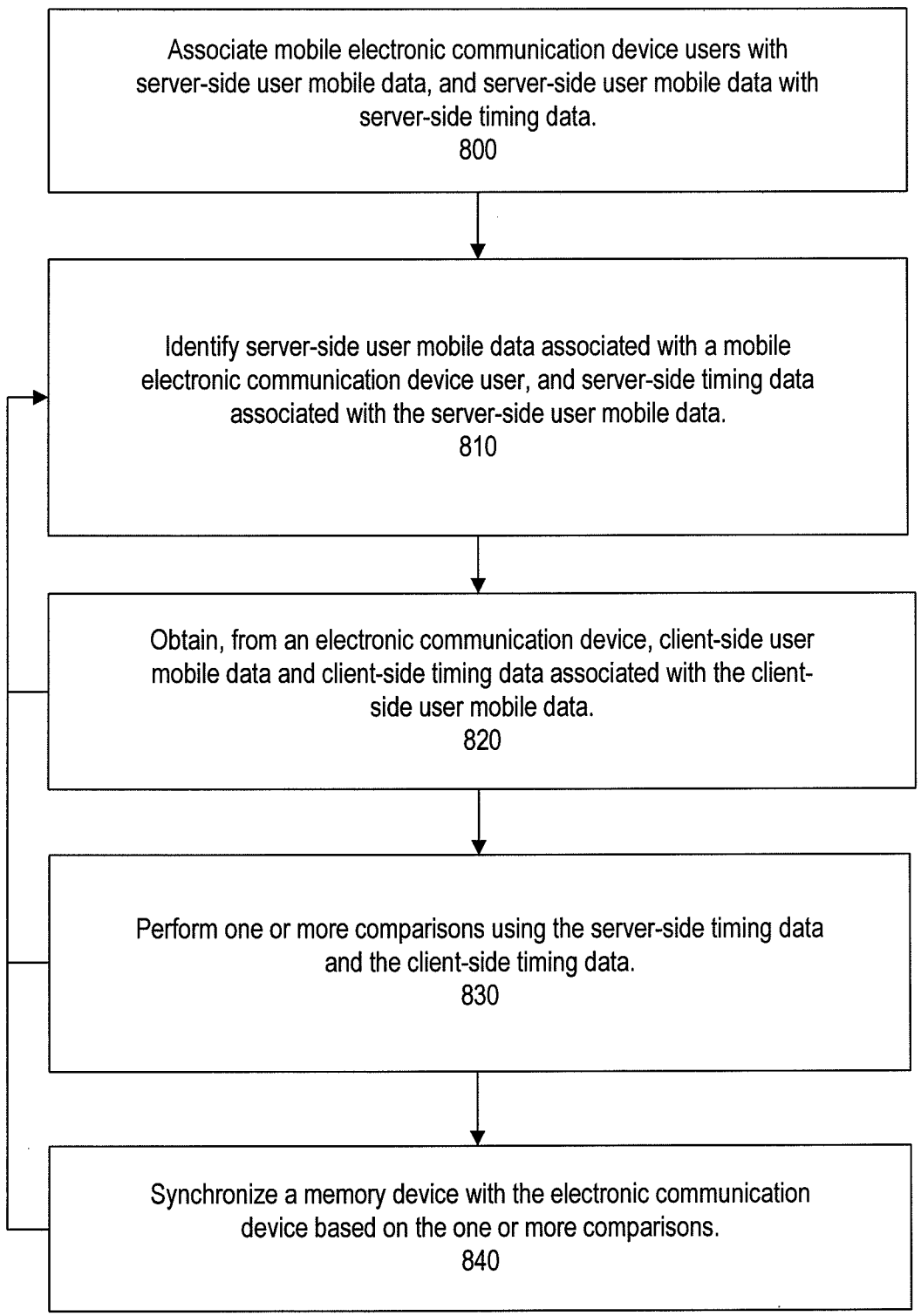
FIG. 8 illustrates another method for managing mobile data, devices, and communications according to various embodiments that involve data synchronization.

FIG. 8 illustrates a method for managing mobile data, devices, and/or communications, according to some embodiments. Step 800 involves associating mobile electronic communication device users with server-side user mobile data, and associating server-side user mobile data with server-side timing data. These associations may be performed in a memory device or by a processor based on information stored in the memory device. The memory device may be, in some embodiments, a database accessible to one or more servers involved in managing the mobile device user's mobile data, devices, and/or communications. In step 810, server-side user mobile data associated with a mobile device user is identified, and server-side timing data associated with the server-side user mobile data is also identified. The server-side user mobile data identified in step 810 comprises data identifying an electronic communication device associated with the mobile device user. Step 820 may further involve obtaining, from an electronic communication device such as the electronic communication device of step 810, client-side user mobile data and client-side timing data associated with the client-side user mobile data. Step 830 further entails performing one or more comparisons using the server-side timing data and the client-side timing data, and step 840 involves synchronizing a memory device with the electronic communication device based on the one or more comparisons. In many embodiments, the memory device may be a database that stores server-side mobile data and associations between the server-side mobile data and server-side timing data and mobile device users. As depicted in FIG. 8, one or more of the steps 810-840 may be repeated or performed periodically in various embodiments. In many embodiments, mobile device users may be able to specify the periodicity with which one or more of these steps are performed.

According to some embodiments, synchronizing the memory device with the electronic communication device (step 840) comprises, for each of the one or more comparisons performed, replacing, in the memory device, server-side user mobile data with corresponding client-side user mobile data, if a corresponding comparison of timing data resulted in a determination that the corresponding client-side user mobile data was more recently updated. Likewise, synchronizing also comprises, for each of the one or more comparisons performed, replacing, in the electronic communication device, client-side user mobile data with corresponding server-side user mobile data, if a corresponding comparison of timing data resulted in a determination that the corresponding server-side user mobile data was more recently updated. According to other embodiments, synchronizing also involves merging user mobile data. For example, during synchronization, user mobile data stored on the electronic communication device may be merged with user mobile data stored on the memory device.

Mobile Data Migration

Figure 9:
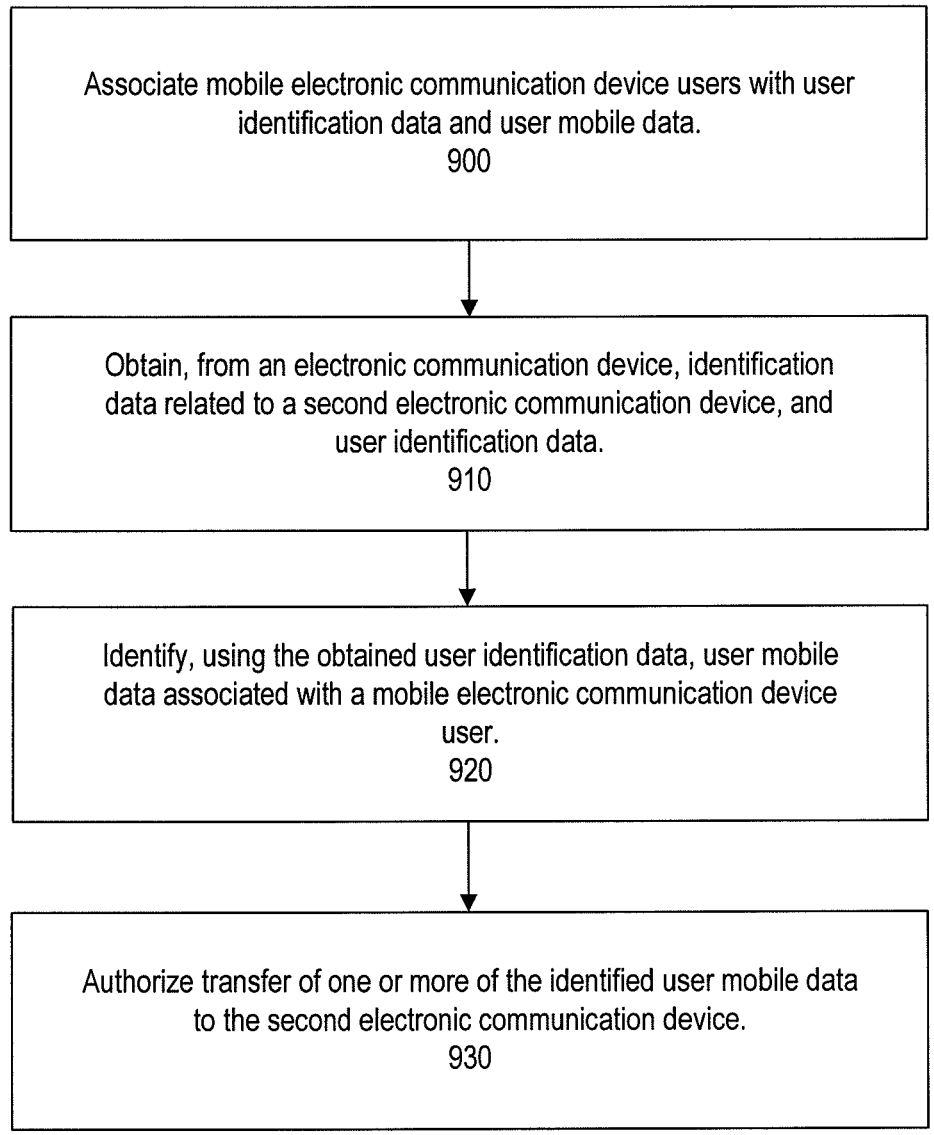
FIG. 9 illustrates a method for managing mobile data, devices, and communications according to various embodiments that involve mobile data migration.

FIG. 9 illustrates a method for managing mobile data, devices and/or communications, according to some embodiments. Step 900 involves associating, in a memory device, mobile electronic device users with user identification data and user mobile data. According to various embodiments, the user mobile data associated with mobile device users may comprise user privacy profiles. Step 910 involves obtaining, from an electronic communication device, identification data related to a second electronic communication device, as well as user identification data. Step 920 further entails identifying, using the obtained user identification data, in a memory device, user mobile data associated with a mobile electronic communication device user. In some embodiments, the memory device may be a database accessible to one or more servers involved in the management of mobile data, devices and/or communications associated with the mobile device user. In some other embodiments, the memory device may be located on or otherwise accessible to a mobile device associated with the mobile device user. Step 930 involves authorizing transfer of one or more of the of the identified user mobile data (e.g. user communication profiles, privacy profiles, call logs, user calendars and contacts) to the second electronic communication device, based on one or more user privacy profiles associated with the identified user mobile data. For example, if a particular user mobile data item such as a particular user contact, is designated, by an applicable privacy profile, as private and not suitable for sharing, that particular user contact may not be transferred to the second electronic communication device.

According to some embodiments, in addition to having the option to transfer mobile data form one mobile device to another, mobile device users also have the option to synchronize particular subsets of their user mobile data, (e.g. only their contact data or only their communication profiles) stored on different mobile devices to a new device. In such embodiments, therefore, the synchronization of multiples devices and data sets to a new device is possible. Moreover, in some embodiments, overlapping sections of data may be appropriately weighted in order that certain data may be erased. Additionally, mobile data from different devices may be combined or merged, as appropriate.

In some other embodiments, mobile device users may be additionally able to purchase data, for example, a partial or full communication profile, from a data provider and synchronize the new data with their previously existing user mobile data. For example, a mobile device user may purchase a user communication profile consisting of font styles, ring tones, background images, saved date, and application suites. Both purchased data and existing user mobile data (e.g. a user's existing contacts) may be migrated to a new mobile device associated with the user.

According to various embodiments, mobile device users may further distinguish between different kinds of user mobile data by categorizing such data into types of information profiles. For example, a mobile device user may have several information profiles, including but not limited to, a 'work' information profile, a 'personal' information profile, a 'music' information profile, and a 'kids' information profile. The 'work' information profile may include a set of leads from the mobile device user's work, the 'personal' information profile may hold personal numbers, the 'music' information profile may hold songs stored on the user's mobile device, and the 'kids' information profile may contain the emergency contact information for the mobile device user's kids. Such categorization may, in some embodiments, enable the mobile device user to more easily transfer to a second mobile device, only the data sets deemed necessary for the user of the second mobile device.

According to some other embodiments, mobile device users may also be able to make their mobile data public. In such embodiments, other mobile device users may be able to access a mobile device user's data without the mobile device user's explicit permission. Making a mobile user's mobile data publicly accessible may make the data easier to distribute to one or more groups of users, and may make synchronizing the data with data on different users' mobile devices easier. Moreover, publicly accessible mobile data may make it possible for mobile devices users to gain access to an extensive set of tools and/or information. In many embodiments, the distribution of a user's publicly available information may be done using the world wide web.

Figure 9A:
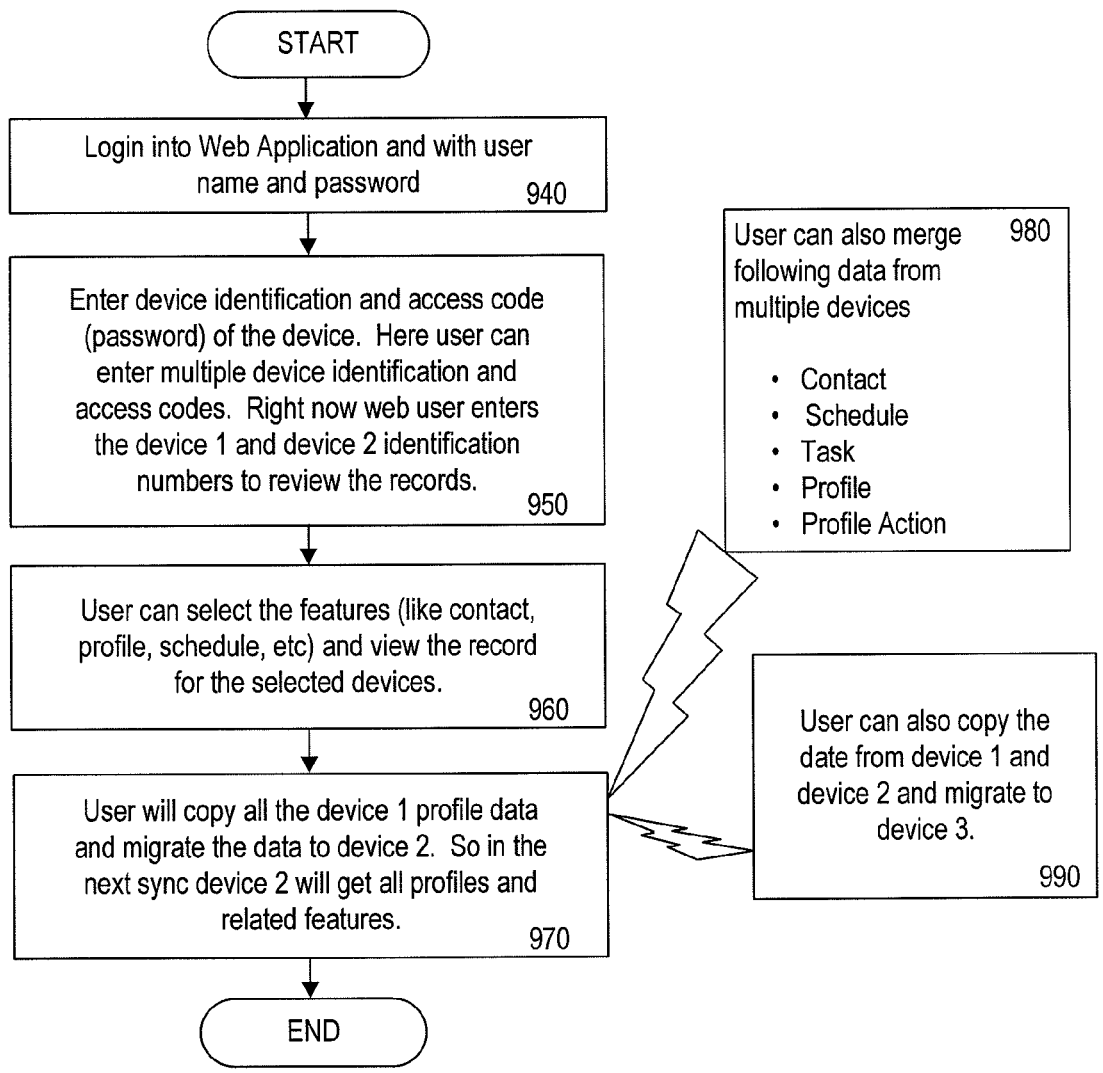
FIG. 9A illustrates a method for managing mobile data, devices, and communications according to a specific embodiment that involves mobile data migration.

FIG. 9A illustrates a particular embodiment relating to the migration of mobile data. In step 940, a mobile device user may log into a web-based application with a user name and a password. In step 950, the mobile device user may enter a device identification and access code (e.g. a password) associated with a mobile device. The user may also enter multiple device identification and access codes. For illustrative purposes, assume that the user, in step 950, enters identification information associated with a device 1 and a device 2 in order to view records associated with those devices. In step 960, the user selects features, such as contacts, profiles, and schedules, and view records associated with these features of the selected devices. In step 970, the user will copy all the profile data associated with device 1 and migrate this data to device 2. Therefore, in the next synchronization, device 2 will get all the profiles and related features associated with device 1. In step 980, the user may also merge data such as contact, schedule, task, profile, and profile action data, from multiple devices. In step 990, the user may copy the data from device 1 and device 2 and migrate the data to a device 3.

Management of Unwanted Communications and Related Data

Figure 10:
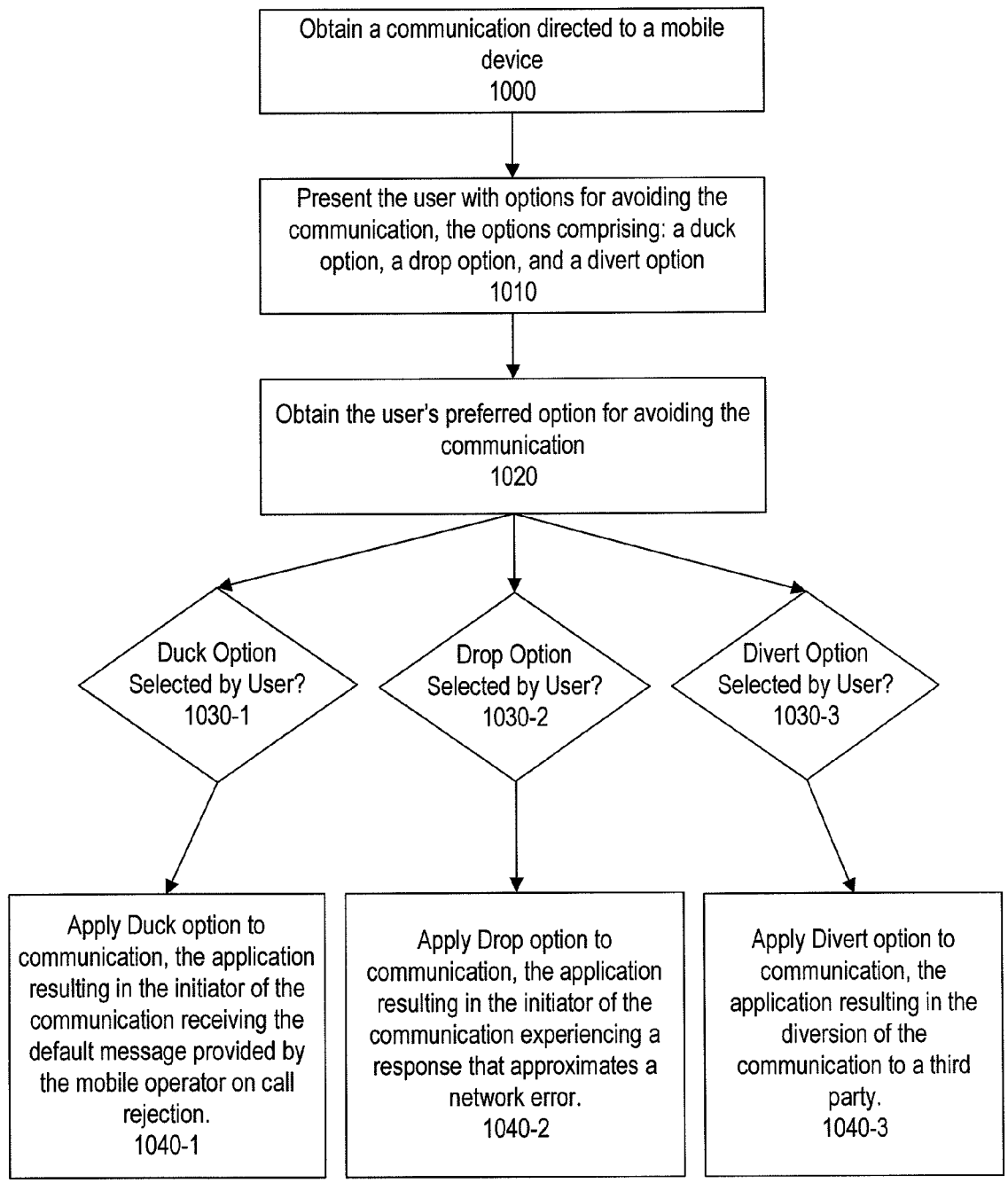
FIG. 10 illustrates a method for managing mobile data, devices, and communications according to various embodiments that involve the management of unwanted communications and related data.

FIG. 10 illustrates a method for managing mobile data, devices and/or communications, according to some embodiments. In step 1000, a communication, such as an incoming call, directed to a mobile device is obtained. In step 1010, the user of the mobile device is presented with options for avoiding the communication. The options may comprise, for example, an option to duck the communication, an option to drop the communication, and an option to divert the communication. In step 1020, the user's preferred option for avoiding the communication is obtained. If the duck option was selected by the user (step 1030-1), the duck option is applied to the communication (step 1040-1). In some embodiments, the application of the duck option may result in the initiator of the communication, for example, the caller, receiving a default message that is usually provided by the mobile network operator on call rejection. Alternatively, if the drop option was selected by the user (step 1030-2), the drop option is applied to the communication (step 1040-2). In some embodiments, the application of the drop option may result in the initiator of the communication experiencing a response that approximates the response a caller might receive when a network error occurs. Alternatively, if the divert option was selected by the user (step 1030-3), the divert option is applied to the communication (step 1040-3). In some embodiments, the application of the divert option may result in the diversion of the communication to a third party. In many embodiments, the diversion of the communication to a third party comprises the diversion of the communication to a phone number of the user's choice and the diversion of the communication to voicemail.

According to some embodiments, an application executing on a mobile device or executing on a server in communication with the mobile device, may automatically avoid unwanted calls by ducking, dropping, or diverting such calls. In such embodiments, the one or more servers participating in the management of a user's mobile devices, data, and/or communications may maintain a table of unwanted callers' numbers on a database, and periodically synchronize this data with corresponding unwanted caller data on the user's mobile device. According to some embodiments, a user may add to, delete from, or otherwise update the data related to unwanted callers using a web-based graphical user interface or using an application executing on his/her mobile device. According to such embodiments, users may also categorize unwanted callers' numbers into such categories as 'Advertising/Promotion,' 'Spam,' and 'Unknown.'

According to various embodiments, a user may be presented with the additional options of 'duck always', 'drop always', and 'divert always' upon detection of an incoming call. In such embodiments, if a mobile device user chooses to apply any of these options to an incoming call, an application may save the caller's number and performs the chosen option whenever a call is received from the same caller. In other embodiments, a mobile device user may be presented with the option to always duck, drop, or divert calls from a particular caller's number after the user has finished having a conversation with the caller. In such embodiments, the user's chosen option is performed whenever a call is subsequently received from the same caller. In yet other embodiments, the user may be presented with an additional option of 'Duck & SMS.' If such an option is chosen, the associated incoming call may be ducked as if the user had selected the 'duck' option, and an SMS message may additionally be sent to the caller. According to many embodiments, the SMS message may be created and/or modified by the mobile user.

According to some other embodiments, a list of a user's 'special' numbers may be maintained on a database or other memory device accessible to the user's mobile devices and/or the server(s) responsible for managing the user's mobile data, devices, and/or communications. The user's 'special' numbers may comprise numbers from which the user would prefer never to miss a call. According to such embodiments, if the mobile device user does miss a call from a number included within the user's special numbers, the user may immediately be notified using, for example, a missed call alert. A missed call alert, according to some embodiments may take various forms, for example, a textual alert (e.g. e-mail or SMS message), a vibrating alert, or an auditory alert. In many embodiments, the form of alert may be configurable by the mobile device user and a list of missed calls may be periodically compiled and updated using memory devices accessible to both the user's mobile device(s) and server(s) involved in the management of the user's mobile data, devices and/or communications. As with other user-related information, missed call information stored on such servers may be automatically synchronized on a periodic basis and/or manually synchronized to make sure that both the servers and the user's mobile device(s) have the most accurate missed call information. Additionally, mobile device users may assign priorities to missed calls and/or the priorities may be automatically deduced and assigned. For example, priorities assignable to missing calls may be deduced by examining the relationship between the sender of the missed call and the recipient mobile device user, and examining communication profiles containing information relating to the sender of the missed communication.

In some other embodiments, a mobile device user may have the option to enable a 'Do Not Disturb' mode that results in all incoming communications, other than calls from numbers included within the user's 'special' numbers list, being ducked, dropped, or diverted. In such embodiments, the user may be able to enable the 'Do Not Disturb' mode by choosing such an option from a preferences screen displayed by an application executing on the user's mobile device or on a server in communication with the mobile device. In some embodiments, the user may have the option to additionally select a 'Number list' option on his/her mobile device. Such an option may allow the user to manually manage compiled lists of numbers, by, for example, allowing the user to view, add to, delete from, or otherwise update such lists as the user's 'special' numbers list, a list of ducked numbers, a list of dropped numbers, and a list of diverted numbers.

Figure 10A:
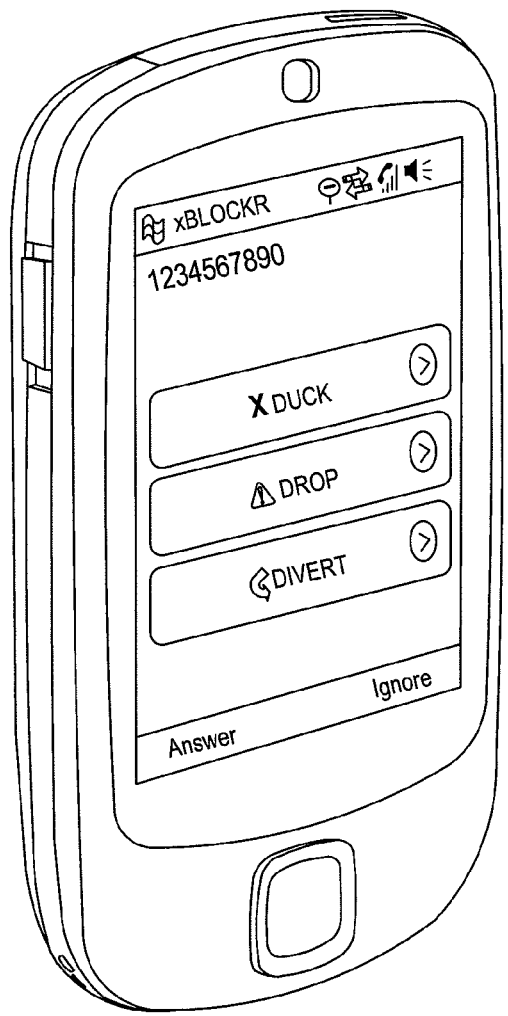
FIGS. 10A and 10B illustrate specific embodiments associated with the presentation of call avoidance options.
Figure 10B:
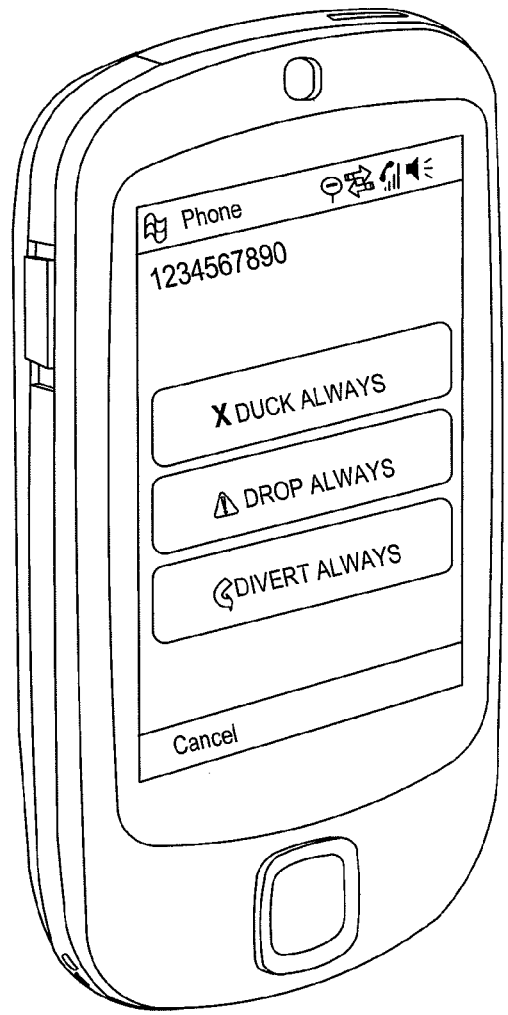

FIGS. 10A and 10B depict specific embodiments associated with the presentation of call avoidance options.

Figure 10C:
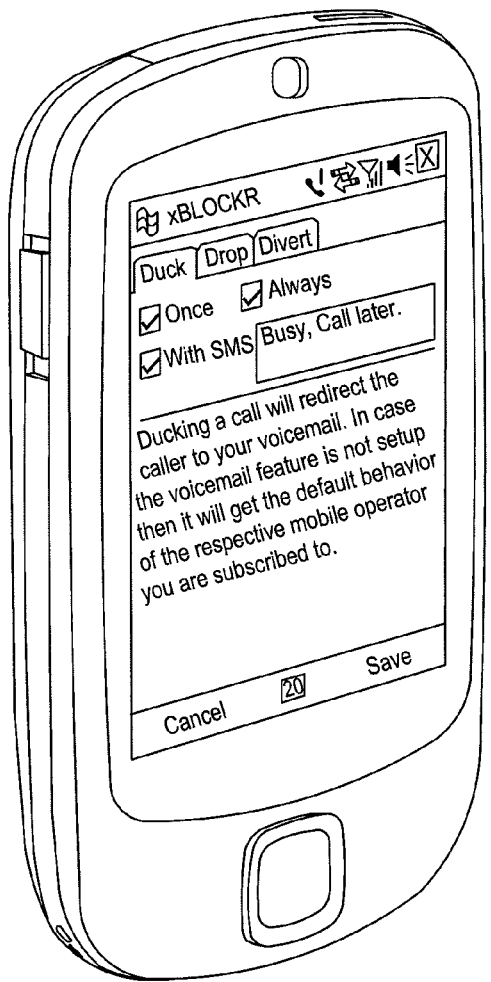
FIGS. 10C, 10D, and 10E depict specific embodiments associated with the set-up and application of call avoidance options.
Figure 10D:
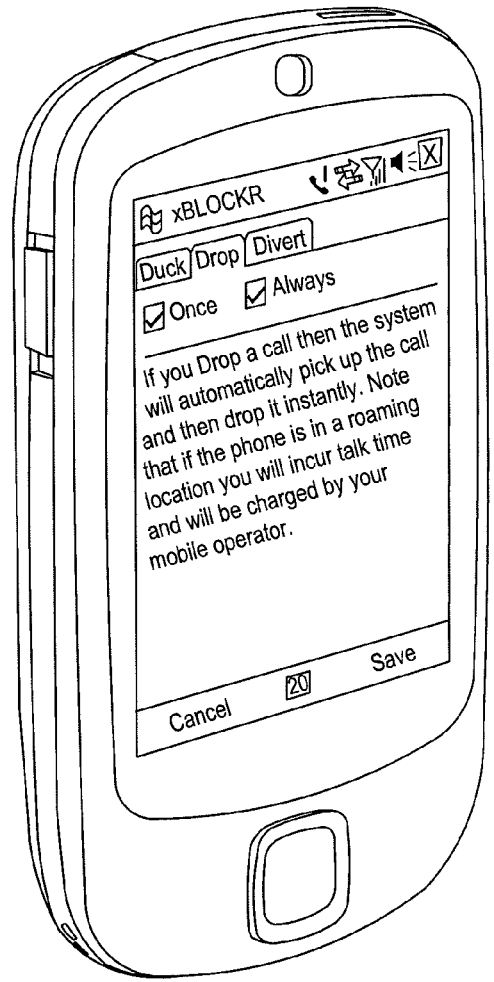
Figure 10E:
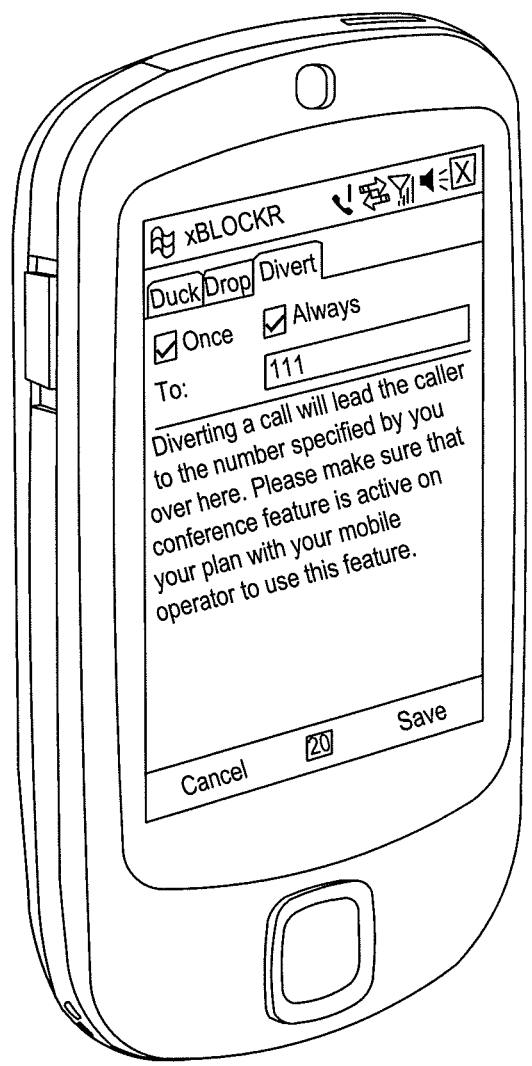

FIGS. 10C, 10D, and 10E depict specific embodiments associated with the set-up and application of call avoidance options.

Communication Scheduling

Figure 11:
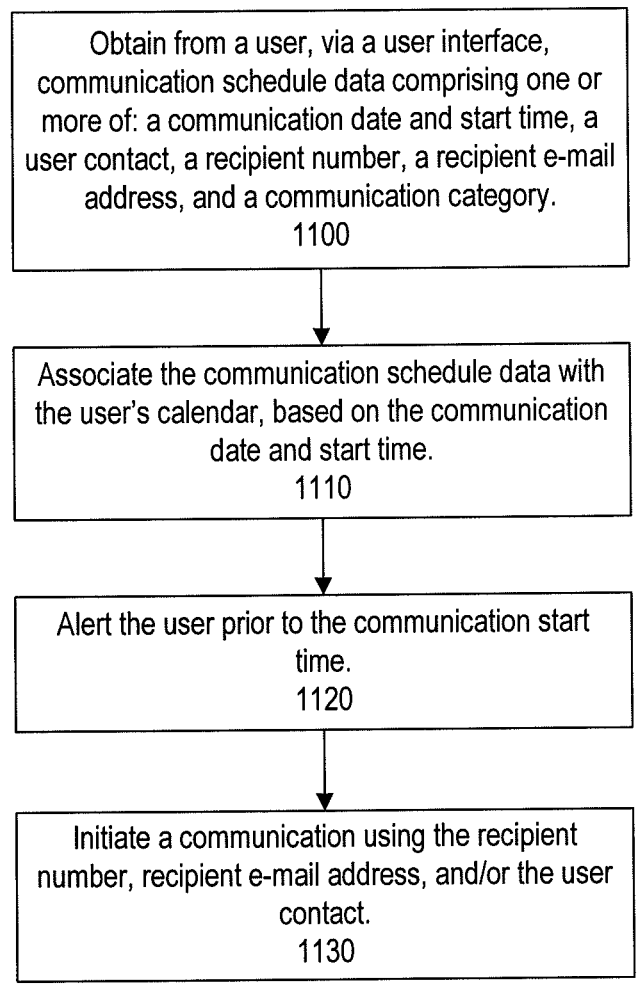
FIG. 11 illustrates a method for managing mobile data, devices, and communications according to various embodiments that involve communication scheduling.

FIG. 11 illustrates a method for managing mobile data, devices and/or communications, according to some embodiments. Step 1100 involves obtaining from a user, via a user interface, communication schedule data comprising one or more of: a communication date and start time, a user contact, a recipient number, a recipient e-mail address, and a communication category. In many embodiments, the communication to be scheduled may comprise a phone call, an SMS message, an MMS message, and an e-mail message. Moreover, in many embodiments, the communication category may comprise a 'social' category, and a 'business' category. Such categories may signify a context associated with the communication to be scheduled.

Step 1110 involves associating the communication schedule data with the user's calendar (e.g. the user's MS-Outlook or other calendar) based on the communication date and start time. In various embodiments, such associating results in making the communication schedule data visible in the user's calendar as a scheduled communication. For example, in many embodiments, if the user subsequent to the execution of step 1110, accesses his/her calendar, the communication schedule data may be visible as an entry in the user's calendar.

Step 1120 involves alerting the user before the time specified by the communication start time is reached. In many embodiments, the alert could take the form of an audible beep, a vibration, and/or a textual message created by a mobile device that is responsible for initiating the scheduled communication.

Step 1130 involves initiating a communication using the recipient number, recipient e-mail address and/or user contact specified as part of the communication schedule data. The scheduled communication in initiated, in many embodiments, at a time corresponding to the date and time of the scheduled communication. For example, if a mobile device user schedules a phone call for 8 am on the 1$^{st}$ of October, 2010, a mobile device associated with the user may dial the number associated with the scheduled phone at 8 am on the 1$^{st}$ of October, after alerting the mobile device user, using an audible beep and a textual message at 7:55 am.

According to various embodiments, the communication schedule data obtained from the mobile device user in step 1100 of the embodiment depicted in FIG. 11 may further comprise data relating to the periodic rescheduling of a communication. For example, the user may specify, using the communication schedule data, that the communication to be scheduled is to be repeated weekly for a two month period. In such embodiments, additional associations between the communication schedule data and the user's calendar are created, based on the data relating to the periodic rescheduling of the communication. For example, a user reviewing his/her calendar after scheduling such a periodic communication may find that a similar communication (incorporating various elements of the first scheduled communication), has been scheduled weekly for a two month period after the first such scheduled communication.

According to some embodiments, a mobile device user's communication schedule data and/or calendar data may be stored on one or more server-side databases accessible to one or more servers involved in managing the user's mobile data, devices and/or communications. Such data may also be stored on and/or be made accessible to, one or more mobile devices associated with the mobile device user. In many embodiments, the mobile device user's communication schedule data and/or calendar data may be synchronized periodically with the corresponding communication schedule data and/or calendar data stored on one or more mobile devices associated with the user.

Changing Mobile Devices and/or Information Associated with Mobile Devices

According to some embodiments, a mobile device user may change information associated with his/her mobile devices. For example, a mobile device user may change the phone numbers associated with one of his/her mobile devices. According to some other embodiments, the mobile device user may at any time associate with him/herself mobile devices that are not at that time associated with him/herself. For example, in some embodiments, a mobile device user may stop using a particular mobile device previously associated with him/herself, and start using a different mobile device that has never been associated with him/herself. In many such embodiments, the assistance of one or more servers already involved in managing the mobile device user's mobile data, devices, and/or communications may be necessary.

According to various embodiments, if a mobile device user intends to begin using a mobile device not previously associated with him/herself, and wishes to have this new device managed by an embodiment of the present invention, the user may be required to inform and/or update a server involved in the management of the user's mobile devices, data, and/or communications of such an intention. The user may additionally have to provide the server with information regarding the new mobile device, such as, a mobile number, an IMEI number, and platforms supported. Based on this information, the server may send the new mobile device (e.g. through an SMS message or by other means), information on downloading a client application which may enable and/or assist the new mobile device in exchanging information with the server. In some embodiments, once the new mobile device has downloaded such a client application, a manual or automatic synchronization with the server may transfer and/or restore mobile data such as user contacts and profiles, to the new mobile device.

Figure 12A:
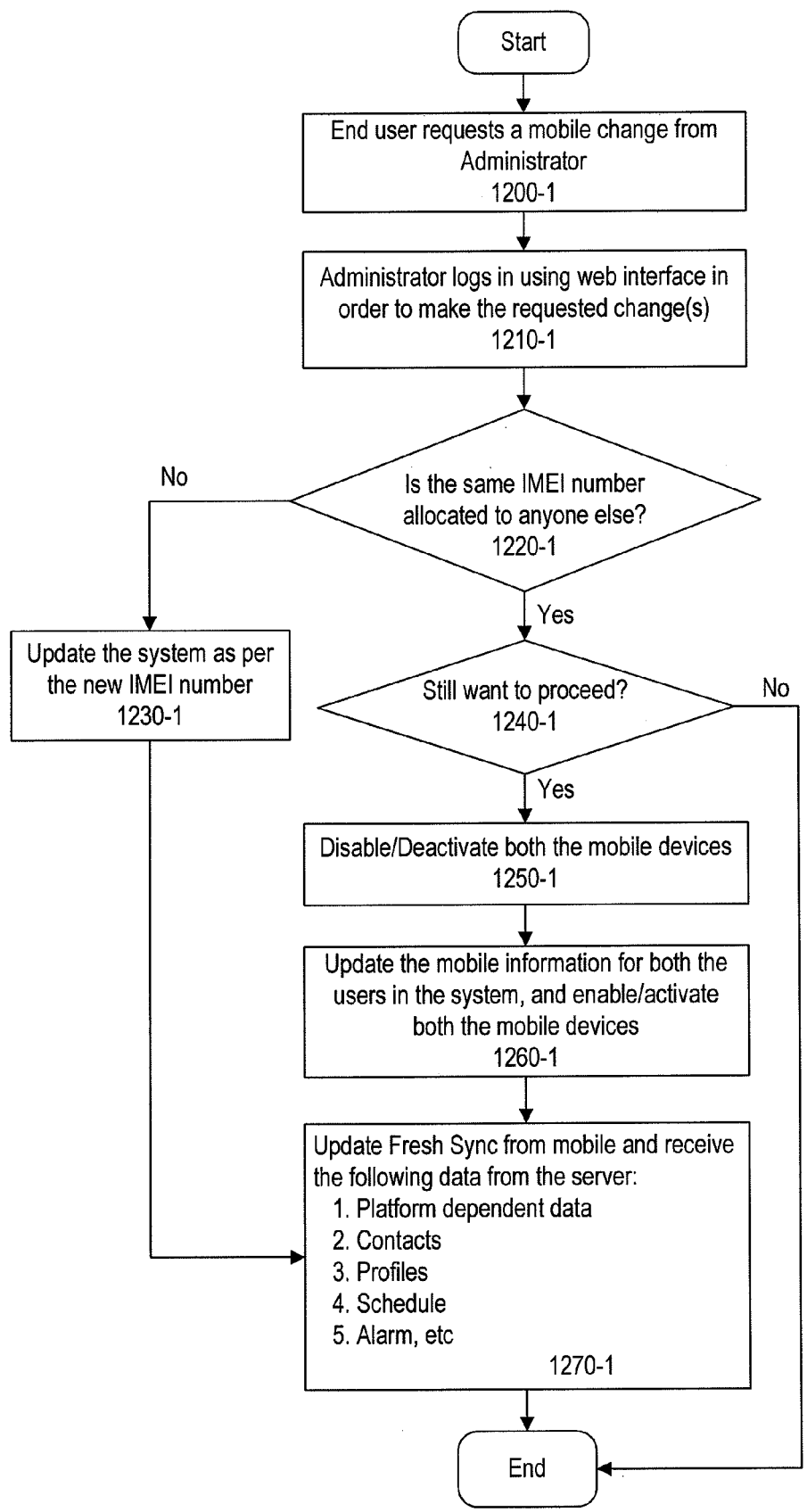
FIG. 12A illustrates a method for managing mobile data, devices, and communications according to various embodiments that involve changing mobile devices.

FIG. 12A depicts a particular embodiment related to changing mobile devices. In step 1200-1, an end-user such as a mobile device user, requests a mobile device change from an administrator. In step 1210-1, the administrator logs in using a web interface in order to make the requested change. Step 1220-1 involves determining if the desired IMEI number is allocated to another user. If the desired IMEI number is not allocated to any other user, the mobile communications management system involved in managing the end-user's mobile data, devices, and/or communications is updated with the new IMEI number in step 1230-1, and further, in accordance with step 1270-1, an update/fresh synch is performed from the user's mobile device, resulting in the receipt of various information (see step 1270-1 below). If, on the other hand, the desired IMEI number is allocated to another user, a determination is made regarding whether or not to proceed, in step 1240-1. If a determination to proceed is made in step 1240-1, then both the mobile devices involved are disabled/deactivated in step 1250-1. In step 1260-1, mobile data for both the users involved is updated in the mobile communications management system, and both the mobile devices are enabled/activated. In step 1270-1, the end-user may use his/her mobile device to update/perform a fresh synch. The mobile device may then receive the following data from one or more servers involved in managing the mobile device, its data and/or communications: (1) platform dependent data; (2) contacts; (3) profiles; (4) schedule, (5) alarm, and any other mobile data.

According to various embodiments, if a mobile device user wishes to change information associated with his/her mobile device (e.g. a phone number), and wishes to continue to have the mobile device managed by an embodiment of the present invention, such a change may require the involvement of one or more servers involved in the management of the mobile device user's mobile data, devices, and/or communications. In some embodiments, such involvement may require one or more of: a determination with regard to whether or not the new information the user wishes to associate with his/her mobile device (e.g. a new phone number) has already been allocated to another user, deactivating and/or disabling one or more mobile device users while the new information is being associated with the user's mobile device, re-activating and/or enabling one or more mobile device users, and synchronizing one or more mobile devices with a server involved in the management of the user's mobile devices, data, and/or communications.

Figure 12B:
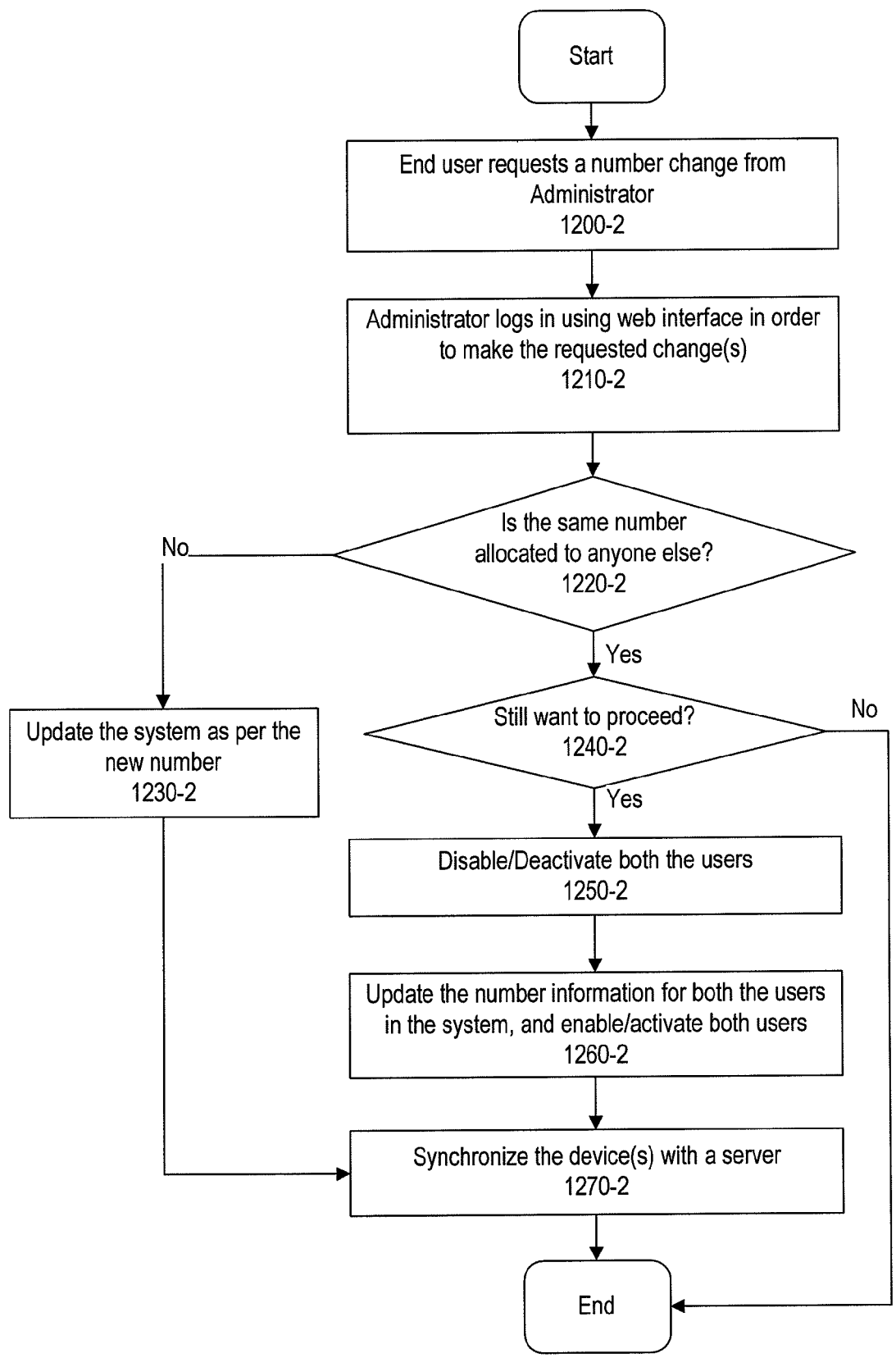
FIG. 12B illustrates a method for managing mobile data, devices, and communications according to various embodiments that involve changing information associated with mobile devices.

FIG. 12B depicts a particular embodiment related to changing mobile phone numbers. In step 1200-2, an end-user such as a mobile device user, requests a mobile number change from an administrator. In step 1210-2, the administrator logs in using a web interface in order to make the requested change. Step 1220-2 involves determining if the desired number is allocated to another user. If the desired number is not allocated to any other user, the mobile communications management system involved in managing the end-user's mobile data, devices, and/or communications is updated with the new number in step 1230-2, and the end-user's mobile device is synchronized with one or more servers involved in managing the user's mobile devices, data, and communications. If, on the other hand, the desired IMEI number is allocated to another user, a determination is made regarding whether or not to proceed, in step 1240-2. If step 1240-2 results in a determination to proceed, then in step 1250-2, both the mobile users involved are disabled/deactivated. In step 1260-2, number information associated with both the users involved is updated in the mobile communications management system, and both the mobile user are enabled/activated. In step 1270-2, both users' mobile devices are synchronized with the one or more servers.

While several embodiments have been described and illustrated herein, those of ordinary skill in the art will readily envision a variety of other means and/or structures for performing the functions and/or obtaining the results and/or the advantages described herein. Those skilled in the art will recognize that the steps of any method may be performed in any order, and certain steps may be omitted. It is understood that in the various methods described herein, the steps may be performed by one or more applications executing on a mobile device, and/or one or more applications executing on one or more servers involved in the management of mobile data, devices, and/or communications. All of these variations and/or modifications are deemed to be within the scope of the embodiments described herein. It should also therefore be understood that the foregoing embodiments are presented by way of example only.

What is claimed is:

1. A mobile communications management system comprising:
   an electronic communication device having an associated user communication profile and associated user identification data;
   a memory device associating a mobile electronic communication device user with the user identification data, and the user communication profile with the mobile device user;
   a server obtaining the user communication profile and the user identification data from the electronic communication device, authenticating the user associated with the user identification data, querying the memory device for an association between the user communication profile and the authenticated user, and creating an association in the memory device between the authenticated user and the user communication profile based on the results of the query;
   an application obtaining a communication directed to or initiated by a mobile electronic communication device associated with the mobile device user, and identifying the user communication profile for application to the communication;
      wherein the user communication profile comprises user preferences related to the handling of incoming and outgoing communications, and user preferences related to the handling of missed communications,
      wherein the application identifies the user communication profile by:
         identifying, in the memory device, a user calendar associated with the mobile device user and a meeting associated with the user calendar, wherein the meeting covers the current time in the current day, and
         selecting a user communication profile associated with the identified meeting, and
      wherein the application identifies a second user communication profile for application to the obtained communication by:
   identifying, in the memory device, a user contact associated with the mobile device user, and selecting a user communication profile associated with the identified user contact; and
   a user interface obtaining a representation of a meeting, and facilitating the creation of associations in the memory device, the associations comprising: a first association between the meeting and the user communication profile a second association between the meeting and a user calendar, and a third association between the user calendar and the mobile device user.

2. The mobile communications management system of claim 1, further comprising:
   a user interface obtaining a user contact, and facilitating, the creation of associations in the memory device comprising: a first association between the user contact and the mobile device user, and a second association between the user communication profile and the user contact.

3. A method for managing mobile communications, data, and devices, said method comprising:
associating, in a memory device, a mobile electronic communication device user with a user communication profile, user identification data, a mobile electronic communication device, and user mobile data, wherein the user mobile data comprises user authorized theft protection measures;
obtaining a communication directed to or initiated by the mobile device;
identifying, in the memory device, the mobile device user associated with the mobile device, and the user communication profile associated with the mobile device user, for application to the obtained communication,
wherein the user communication profile comprises user preferences related to the handing of incoming and outgoing communications, and user preferences related to the handling of missed communications, and
wherein the user communication profile is identified by:
identifying, in the memory device, a user calendar associated with the mobile device user and a meeting associated with the user calendar, wherein the meeting covers the current time in the current day, and
selecting a user communication profile associated with the identified meeting;
obtaining, from an electronic communication device, mobile device identification data of missing mobile device, and the user identification data;
identifying, in the memory device, the user mobile data associated with the mobile device user; and
initiating tasks based on the user mobile data comprising: tasks that preserve user data integrity, tasks that prevent misuse of the mobile device, and tasks that aid in the recovery of the mobile device,
wherein the tasks that preserve user data integrity comprise making a backup of client-side user mobile data stored on the mobile electronic communication device, and deleting the client-side user mobile data;
wherein the tasks that prevent misuse of the mobile device comprise blocking incoming and outgoing communications from the mobile device, the incoming and outgoing communications comprising text messages, electronic mail messages, and phone calls; and
wherein the tasks that aid in the recovery of the mobile device comprise directing incoming and outgoing communications from the mobile device to a predefined electronic communications device, recording and obtaining communications made using the mobile device, and tracking the location of the mobile device.

4. The method of claim 3, further comprising:
monitoring the mobile electronic communication device,
identifying in the memory device the user mobile data associated with the mobile device user; and
initiating tasks based on the user authorized theft protection measures comprising: tasks that preserve user data integrity, tasks that prevent the misuse of the mobile device, and tasks that aid in the recovery of the mobile device;
wherein monitoring the mobile device comprises one or more of:
monitoring the usage of the mobile device to detect changes in usage patterns, the usage patterns comprising patterns associated with parties contacted and patterns associated with the duration of communications, and
monitoring ambient data obtained from the mobile device, the ambient data comprising audio, video, and location data.

5. The method of claim 3, further comprising:
associating, in a memory device, the mobile electronic communication device user with server-side user identification data, the user with server-side user mobile data, and the server-side user mobile data with server-side timing data;
obtaining, from an electronic communication device, client-side user identification data, client-side user mobile data, and client-side timing data associated with the client-side user mobile data;
identifying, in the memory device, the server-side user mobile data associated with the mobile device user, and the server-side timing data associated with the server-side mobile data;
performing one or more comparisons between the identified server-side timing data and the client-side timing data; and
synchronizing the memory device with the electronic communication device based on the one or more comparisons,
wherein user mobile data comprises user contacts, user calendars, user communication profiles, and user authorized theft protection measures.

6. The method of claim 5, wherein synchronizing the memory device with the electronic communication device comprises, for each of the one or more comparisons:
replacing using a history, in the memory device, one of the server-side user mobile data with a corresponding one of the client-side user mobile data, if the comparison resulted in a determination that the one of the client-side user mobile data was more recently updated, and
replacing using the history, in the electronic communication device, one of the client-side user mobile data with a corresponding one of the server-side user mobile data, if the comparison resulted in a determination that the one of the server-side user mobile data was more recently updated.

7. The method of claim 3, further comprising:
associating, in the memory device, first user identification data with a first mobile electronic communication device user, and the first mobile electronic communication device user with first user mobile data, wherein the first user mobile data comprises user contacts, user calendars, user communication profiles, user authorized theft protection measures, and user privacy profiles;
obtaining, from a first electronic communication device, identification data related to a second electronic communication device, and the first user identification data;
identifying, using the first user identification data, in the memory device, the first user mobile data associated with the first mobile device user; and
authorizing transfer of one or more of the first user mobile data to the second electronic communication device, based on one or more of the user privacy profiles.

8. A method for managing mobile communications, data, and devices, the method comprising:

associating, in a memory device, a mobile electronic communication device user with server-side, user mobile data, and the server-side user mobile data with server-side timing data;

a server periodically:
identifying in the memory device, the server-side user mobile data associated with the mobile device user, and the server-side timing data associated with the server-side user mobile data, wherein the server-side user mobile data comprises data identifying an electronic communication device associated with the mobile device user, obtaining from the electronic communication device, client-side user mobile data and client-side timing data associated with the client-side user mobile data, and performing one or more comparisons using the server-side timing data and the client-side timing data, the one or more comparisons being configurable by the mobile device user; and periodically synchronizing the memory device with the electronic communication device based on the one or more comparisons.

9. The method of claim 8, wherein synchronizing the memory device with the electronic communication device comprises, for each of the one or more comparisons:

replacing using a history, in the memory device, one of the server-side user mobile data with a corresponding one of the client-side user mobile data, if the comparison resulted in a determination that the one of the client-side user mobile data was more recently updated, and replacing using the history, in the electronic communication device, one of the client-side user as data with a corresponding one of the server-side user mobile data, if the comparison resulted in a determination that the server-side user mobile data was more recently updated.

10. A method for managing mobile communications, data, and devices, the method comprising:

an application associated with a mobile device obtaining a communication directed to the mobile device;

the application presenting the user of the mobile device with options for handling the communication, the options comprising: a duck option, a drop option, and a divert option;

the application obtaining the user's preferred option for handling the communication; and the application applying the user's preferred option to the communication, wherein the duck option results in the initiator of the communication receiving a default voice message that is routinely utilized when processing call rejections by a mobile operator handling the communication directed to the mobile device, and a user-configurable textual message from the mobile device;

wherein the drop option results in the initiator of the communication experiencing a response that approximates a network error; and wherein the divert option results in the diversion of the communication to a third party.

11. The method of claim 10, wherein the third party comprises an auto answering device, a teller machine, a conversation recording device, and a backup device.

12. A method for managing mobile communications, data, and devices, the method comprising:

a plug-in application that is custom-built, in accordance with requirements of a first application to assist the first application in obtaining data related to a mobile device user, assisting the first application to obtain said data related to the mobile device user, the first application being communicatively coupled to a server through the plug-in, the data comprising calendar data and user mobile data;

utilizing, the first application to perform one or more tasks comprising:
updating calendar entries and updating user mobile data, and updating data on a memory device communicatively coupled to the server based on the one or more tasks performed, wherein the calendar entries comprise scheduled meetings and scheduled communications, and wherein the user mobile data comprises user communication profiles, user privacy profiles, and user contacts.

13. A method for managing mobile communications, data, and devices, said method comprising:

associating, in a memory device, a mobile electronic communication device user with a user communication profile, and a mobile electronic communication device;

obtaining a communication directed to or initiated by the mobile device;

identifying, in the memory device, the mobile device user associated with the mobile device, and the user communication profile associated with the mobile device user, for application to the obtained communication;

wherein the user communication profile comprises user preferences related to the handing of incoming and outgoing communications, and user preferences related to the handling of missed communications, and wherein the user communication profile is identified by:
identifying, in the memory device, a user calendar associated with the mobile device user and a meeting associated with the user calendar, wherein the meeting covers the current time in the current day, and selecting a user communication profile associated with the identified meeting;

obtaining from the user, using a user interface, communication schedule data, the communication schedule data comprising one or more of: a communication date and start time, a user contact, a recipient number, a recipient e-mail address, and a communication category;

associating, using an application, the communication schedule data with the user's calendar based on the communication date and start time;

alerting the user, by the mobile device associated with the user, prior to the communication start time; and initiating, by the mobile device, a communication using the recipient number, the recipient e-mail address and/or the user contact, wherein the communication schedule data further comprises data relating to the periodic rescheduling of a communication, wherein the application creates additional associations between the communication schedule data and the user's calendar based on the data relating to the periodic rescheduling of the communication, and wherein the mobile device initiates further communications based on the periodic rescheduling of the communication.

14. A method for managing mobile communications, data, and devices, said method comprising:

associating, in a memory device, a mobile electronic communication device user with a user communication profile, user mobile data, and a mobile electronic communication device, wherein the user mobile data comprises data indicative of user authorized theft protection measures;

obtaining a communication directed to or initiated by the mobile device;

identifying, in the memory device, the mobile device user associated with the mobile device, and the user communication profile associated with the mobile device user, for application to the obtained communication,
- wherein the user communication profile comprises user preferences related to the handing of incoming and outgoing communications, and user preferences related to the handling of missed communications, and
- wherein the user communication profile is identified by:
  - identifying, in the memory device, a user calendar associated with the mobile device user and a meeting associated with the user calendar, wherein the meeting covers the current time in the current day, and
  - selecting a user communication profile associated with the identified meeting;

monitoring the mobile electronic communication device;

identifying in the memory device the user mobile data associated with the mobile device user; and initiating tasks based on the user authorized theft protection measures comprising: tasks that preserve user data integrity, tasks that prevent misuse of the mobile device, and tasks that aid in the recovery of the mobile device,
- wherein monitoring the mobile device comprises one or more of:
  - monitoring the usage of the mobile device to detect changes in usage patterns, the usage patterns comprising patterns associated with parties contacted and patterns associated with the duration of communications, and
  - monitoring ambient data obtained from the mobile device, the ambient data comprising audio, video, and location data,
- wherein the tasks that preserve user data integrity comprise making a backup of client side user mobile data stored on the mobile electronic communication device, and deleting the client-side user mobile data,
- wherein the tasks that prevent misuse of the mobile device comprise blocking incoming and outgoing communications from the mobile device, the incoming and outgoing communications comprising text messages, electronic mail messages, and phone calls, and
- wherein the tasks that aid in the recovery of the mobile device comprise directing incoming and outgoing communications from the mobile device to a predefined electronic communications device, recording and obtaining communications made using the mobile device, and tracking the location of the mobile device.

* * * * *